United States Patent
Aiyama

(10) Patent No.: US 7,573,595 B2
(45) Date of Patent: Aug. 11, 2009

(54) INFORMATION MEDIUM ISSUE SYSTEM, ISSUE PROCESSING METHOD, STORAGE MEDIUM OF STORING COMPUTER-READABLE PROGRAM, AND PROGRAM

(75) Inventor: Kenji Aiyama, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 898 days.

(21) Appl. No.: 10/998,626

(22) Filed: Nov. 30, 2004

(65) Prior Publication Data

US 2005/0141022 A1 Jun. 30, 2005

(30) Foreign Application Priority Data

Dec. 3, 2003 (JP) ............... 2003-404290

(51) Int. Cl.
G06F 3/12 (2006.01)
G06E 1/02 (2006.01)

(52) U.S. Cl. ............... 358/1.15; 705/22; 705/28

(58) Field of Classification Search .......... 358/1.15
See application file for complete search history.

(56) References Cited

U.S. PATENT DOCUMENTS 6,950,198 B1 * 9/2005 Berarducci et al. ......... 358/1.12
7,342,695 B2 * 3/2008 Matsugi ..................... 358/531
2002/0076245 A1 6/2002 Aiyama ...................... 400/61
2003/0093312 A1 * 5/2003 Ukita et al. ................. 705/10

FOREIGN PATENT DOCUMENTS

JP 2001-273459 10/2001
JP 2002-259076 9/2002

* cited by examiner

Primary Examiner—Mark K Zimmerman
Assistant Examiner—Huo Long Chen
(74) Attorney, Agent, or Firm—Fitzpatrick, Cella, Harper & Scinto

(57) ABSTRACT

In order to freely construct an issue processing system which newly issues printed materials of necessary and sufficient amount by effectively using stocked printed materials, and thus achieve the issue process in a high-operability and high-convenience environment, a file information list is acquired and displayed from a document server, it is controlled by a controller of a printer to display a screen for accepting an acquirement indication for the file information, a stock of the file information selected on the screen is inquired to a stock management server, the stock information is thus acquired, and it is controlled, according to the acquired stock information, to cause a display unit to display a screen for accepting either one of a delivery indication and an information writing indication selectable by user or accepting both the delivery indication and the information writing indication selectable by user.

10 Claims, 20 Drawing Sheets

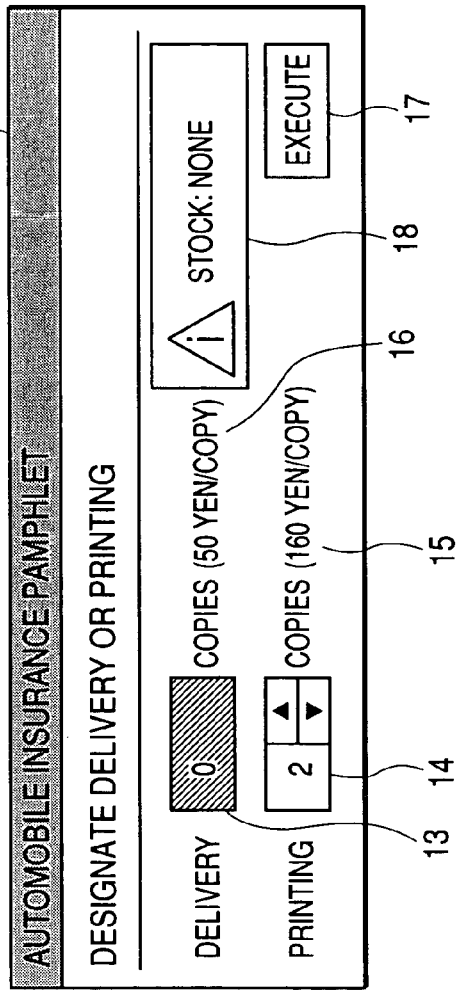

| | DOCUMENT ID | DOCUMENT NAME | NUMBER OF PAGES | PATH |
|---|---|---|---|---|
| 1 | 0001 | FIRE INSURANCE PAMPHLET | 10 | /document/insurance/kasaihoken.pdf |
| 2 | 0005 | THEFT INSURANCE PAMPHLET | 20 | /document/insurance/tounanhoken.pdf |
| 3 | 0006 | AUTOMOBILE INSURANCE PAMPHLET | 4 | /document/insurance/jidoushahoken.pdf |
| 4 | 0009 | COMPANY PROSPECTUS 2003 | 8 | /document/company/annnai2003/pdf |
| 5 | 0010 | LIST OF AGENCIES 2003 | 6 | /document/dairiten/ichiran.pdf |

FIG. 10

| | DOCUMENT ID | NUMBER OF STOCKS | NUMBER OF PAGES | UNIT PRICE |
|---|---|---|---|---|
| 1 | 0001 | 100 | 10 | 100 |
| 2 | 0005 | 85 | 20 | 180 |
| 3 | 0006 | 40 | 4 | 50 |
| 4 | 0009 | 0 | 8 | 100 |
| 5 | 0010 | 10 | 6 | 50 |

FIG. 11

| | BASE | COST PER PAGE |
|---|---|---|
| 1 | SAPPORO | 40 |
| 2 | SENDAI | 35 |
| 3 | TOKYO | 32 |
| 4 | NAGOYA | 35 |
| 5 | OSAKA | 38 |

FIG. 14

STOCK MANAGEMENT

| | TAKING-IN PROC | TAKING-OUT PROC | STOCK DISPLAY | COST INPUT |
|---|---|---|---|---|

| | DOCUMENT ID | STOCK | NUMBER OF PAGES | UNIT PRICE |
|---|---|---|---|---|
| 1 | 0001 | 100 | 10 | 100 |
| 2 | 0005 | 85 | 20 | 180 |
| 3 | 0006 | 40 | 4 | 50 |
| 4 | 0009 | 0 | 8 | 100 |
| 5 | 0010 | 10 | 6 | 50 |

STOCK MANAGEMENT

| | TAKING-IN PROC | TAKING-OUT PROC | STOCK DISPLAY | COST INPUT |
|---|---|---|---|---|

| | BASE | COST PER PAGE |
|---|---|---|
| 1 | SAPPORO | 40 |
| 2 | SENDAI | 35 |
| 3 | TOKYO | 32 |
| 4 | NAGOYA | 35 |
| 5 | OSAKA | 38 |

COST  40

OK

| DOCUMENT ID | 006 |
|---|---|
| STOCK AMOUNT | 40 |
| UNIT PRICE OF PRINTED MATERIAL | 50 |
| UNIT PRICE OF PRINTED PAGE | 40 |
| NUMBER OF PAGES | 4 |

| ID | TITLE | STOCK | PATH |
|---|---|---|---|
| 0001 | ANALOG SEMICONDUCTOR CATALOG CD | 10 | /cddata/catalog/analog.iso |
| 0005 | IC CATALOG CD | 20 | /cddata/catalog/ic.iso |
| 0006 | GENERAL CATALOG CD | 4 | /cddata/catalog/all.iso |
| 0009 | IC100 SERIES DATA SHEET CD | 8 | /cddata/datasheet/ic100.iso |
| 0010 | DESIGN GUIDE CD | 6 | /cddata/technical/designguide.iso |

FIG. 22

| | BASE | DURATION OF DELIVERY (DAY) |
|---|---|---|
| 1 | SAPPORO | 2 |
| 2 | SENDAI | 2 |
| 3 | TOKYO | 0 |
| 4 | NAGOYA | 1 |
| 5 | OKINAWA | 3 |

FIG. 23

STOCK MANAGEMENT

| ID | TITLE | STOCK | PATH |
|---|---|---|---|
| 0001 | ANALOG SEMICONDUCTOR CATALOG CD | 10 | /cddata/catalog/analog.iso |
| 0005 | IC CATALOG CD | 20 | /cddata/catalog/ic.iso |
| 0006 | GENERAL CATALOG CD | 4 | /cddata/catalog/all.iso |
| 0009 | IC100 SERIES DATA SHEET CD | 8 | /cddata/datasheet/ic100.iso |
| 0010 | DESIGN GUIDE CD | 6 | /cddata/technical/designguide.iso |

NEW TITLE — 83
DELETE TITLE — 84
TAKING-IN — 85
TAKING-OUT — 86

FIG. 24

NEW TITLE

ID 0011
DELIVERY INDICATION: IC SERIES DATA SHEET CD
DELIVERY INDICATION: /cddata/datasheet/ic200.iso [BROWSE]
[OK]

TAKING-IN

ID : 0006
TITLE : GENERAL CATALOG CD
NUMBER OF TAKING-IN: 100  [OK]

| TAKING-OUT | |
|---|---|
| ID : 0005 | |
| TITLE : IC CATALOG CD | |
| NUMBER OF TAKING-OUT: 15 | OK |

DELIVERY DURATION MANAGEMENT

| | BASE | DURATION OF DELIVERY |
|---|---|---|
| 1 | SAPPORO | 2 |
| 2 | SENDAI | 2 |
| 3 | TOKYO | 0 |
| 4 | NAGOYA | 1 |
| 5 | OSAKA | 3 |

OK

~W14

| ID | 006 |
|---|---|
| STOCK AMOUNT | 40 |
| DURATION OF DELIVERY | 50 |

FIG. 34

STORAGE MEDIUM SUCH AS FD, CD-ROM, OR THE LIKE

| DIRECTORY INFORMATION |
|---|
| 1ST DATA PROC PROGRAM<br>PROGRAM CODE GROUP CORRESPONDING TO STEPS IN FLOW CHARTS OF FIG. 9 |
| 2ND DATA PROC PROGRAM<br>PROGRAM CODE GROUP CORRESPONDING TO STEPS IN FLOW CHARTS OF FIG. 16 |
| 3RD DATA PROC PROGRAM<br>PROGRAM CODE GROUP CORRESPONDING TO STEPS IN FLOW CHARTS OF FIG. 17 |
| 4TH DATA PROC PROGRAM<br>PROGRAM CODE GROUP CORRESPONDING TO STEPS IN FLOW CHARTS OF FIG. 19 |
| 5TH DATA PROC PROGRAM<br>PROGRAM CODE GROUP CORRESPONDING TO STEPS IN FLOW CHARTS OF FIG. 28 |
| 6TH DATA PROC PROGRAM<br>PROGRAM CODE GROUP CORRESPONDING TO STEPS IN FLOW CHARTS OF FIG. 30 |
| |

MEMORY MAP OF STORAGE MEDIUM

INFORMATION MEDIUM ISSUE SYSTEM, ISSUE PROCESSING METHOD, STORAGE MEDIUM OF STORING COMPUTER-READABLE PROGRAM, AND PROGRAM

BACKGROUND OF THE INVENTION

1. Field of the Invention

The present invention relates to an information medium issue system in which a file server of holding predetermined file information, a stock management server of managing a stock of information-recorded media (i.e., media on which information has already been recorded), and an information writing apparatus disposed at each base can communicate with others, an issue processing method which is applicable to the information medium issue system, a storage medium which stores a computer-readable program for achieving the issue processing method, and the program itself.

2. Related Background Art

Conventionally, in a case of printing a large number of pamphlets, booklets or brochures (hereinafter, simply called pamphlets), it is general to provide them on business bases for sales promotion of goods, services and the like and then give these pamphlets out to customers who are considering to buy these goods, services and the like. To achieve such purposes, ordinarily, printing of the pamphlets is ordered to a printing company, a print shop, a printing office or the like (hereinafter, simply called the printing company), and then the pamphlets delivered from the printing company are distributed to the respective business bases.

Thus, in such a form of company having the plural business bases, an appropriate number of printed materials delivered from the printing company are distributed to the respective business bases. In that case, the pamphlets are kept in the warehouse of, e.g., headquarters to provide them immediately when the pamphlet are exhausted in the business base.

Incidentally, when the printing of the pamphlets is ordered to the printing company, the number of prints is determined by estimating how much number of pamphlets is used and consumed at the whole business bases. Then, in ordinary circumstances, when the printed pamphlets are completely exhausted, the printing thereof is reordered to the printing company.

By the way, Japanese Patent Application Laid-Open No. 2002-259076 (hereinafter called a document 1) and Japanese Patent Application Laid-Open No. 2001-273459 (hereinafter called a document 2) have been published to disclose the techniques for effectively reordering the printing.

That is, in the document 1, a user database for memorizing registration data about a user, a contents database for storing the data constituting a printed material, a template database for the user to select and specify a layout template of the printed material, and an accounting information management database for managing the information about use and purchase of the user are provided. Thus, contents data, a layout template and output specification information are memorized, the data constituting the output printed material is associated with the registration data concerning the user and stored, and the stored data are held and managed, whereby it is possible to recorder the printing based on the held and managed data constituting the output printed material.

Besides, according to the print processing system according to the document 2, a block-copy database which memorized the electronic block copies of plural documents, an in-house terminal and a printer which are connected to the block-copy database through a network, and an in-house printing system which is connected to the block-copy database through the network are provided. In addition, a server which executes a bid concerning the printing using the electronic block copy registered in the block-copy database and orders the printing using the electronic block copy to a tender (printing company) is provided. Thus, it is possible to cope with small-amount printing by causing a printer to perform individual printing and it is also possible to cope with large-amount printing by ordering it through the bid.

The block copy is electrically corrected through the network when the printing is actually performed. Then, the printing company is determined and the printing is ordered through the bid in case of reprinting a large number of documents, while the printing is individually performed by using the printer in case of reprinting a small number of documents. Thus, it is possible to order the printing company in case of performing large-amount and non-urgent printing, and it is also possible to print the documents by the printer in case of performing urgent printing.

However, in the document 1, although it is possible to easily reorder the printing, it is difficult to perform the printing by using the printer or the like when a small number of documents are immediately needed.

Moreover, in the document 2, although it is possible to easily perform the printing by using the printer or the like when a small number of documents are immediately needed, it is difficult for a person in charge who has to distribute the printed materials such as the printed pamphlets to the business bases to confirm whether or not the printed pamphlets are stocked. Thus, it is further difficult for the person in charge to confirm and determine whether to directly print the pamphlets by the printer or to order the printing of the pamphlets to the printing company.

SUMMARY OF THE INVENTION

An object of the present invention is to provide an information medium issue system and an information medium issue processing method which can solve the above-described conventional problems, a storage medium which stores a computer-readable program for achieving the information medium issue processing method, and the program itself.

Another object of the present invention is to provide an information medium issue system and an information medium issue processing method in which, for example, it is possible to freely construct an issue processing system for newly issuing printed materials of only necessary and sufficiently number of copies so as to effectively use the stocked printed materials, thereby effectively achieving an issue process for a large or small number of copies to be reproduced or reprinted without increasing the stocked printed materials, a storage medium which stores a computer-readable program for achieving the information medium issue processing method, and the program itself.

Other objects and features of the present invention will become apparent from the following description in conjunction with the accompanying drawings.

BRIEF DESCRIPTION OF THE DRAWINGS

FIG. 7 is a diagram showing an example of the pamphlet print setting screen displayed on the operation unit of the printer shown in FIG. 4;

FIG. 8 is a diagram for explaining the data construction of the database of the document server shown in FIG. 4;

FIG. 10 is a diagram for explaining the data construction of the database in the stock management server shown in FIG. 4;

FIG. 11 is a diagram for explaining the data construction of the cost management database in the stock management server shown in FIG. 4;

FIG. 14 is a diagram showing an example of the stock management screen displayed on the display unit of the stock management server shown in FIG. 4;

FIG. 15 is a diagram showing an example of the stock management screen displayed on the display unit of the stock management server shown in FIG. 4;

FIG. 22 is a diagram showing the data construction of the delivery time database managed by the management server shown in FIG. 20;

FIG. 23 is a diagram showing an example of the operation screen displayed on the display unit of the management server shown in FIG. 20;

FIG. 24 is a diagram showing an example of the operation screen displayed on the display unit of the management server shown in FIG. 20;

FIG. 25 is a diagram showing an example of the operation screen displayed on the display unit of the management server shown in FIG. 20;

FIG. 26 is a diagram showing an example of the operation screen displayed on the display unit of the management server shown in FIG. 20;

FIG. 27 is a diagram showing an example of the operation screen displayed on the display unit of the management server shown in FIG. 20;

FIG. 34 is a diagram for explaining the memory map of the storage medium which stores various kinds of data processing programs capable of being read by the image processing apparatus according to the present invention.

DETAILED DESCRIPTION OF THE PREFERRED EMBODIMENTS

Hereinafter, the preferable embodiments of the present invention will be explained in detail with reference to the accompanying drawings.

First Embodiment

In the first embodiment, an ODP (On-Demand Printing system) will be explained. However, the scope of the present invention is not limited to the examples described hereinafter.

(Configuration of Print System)

Figure 1:
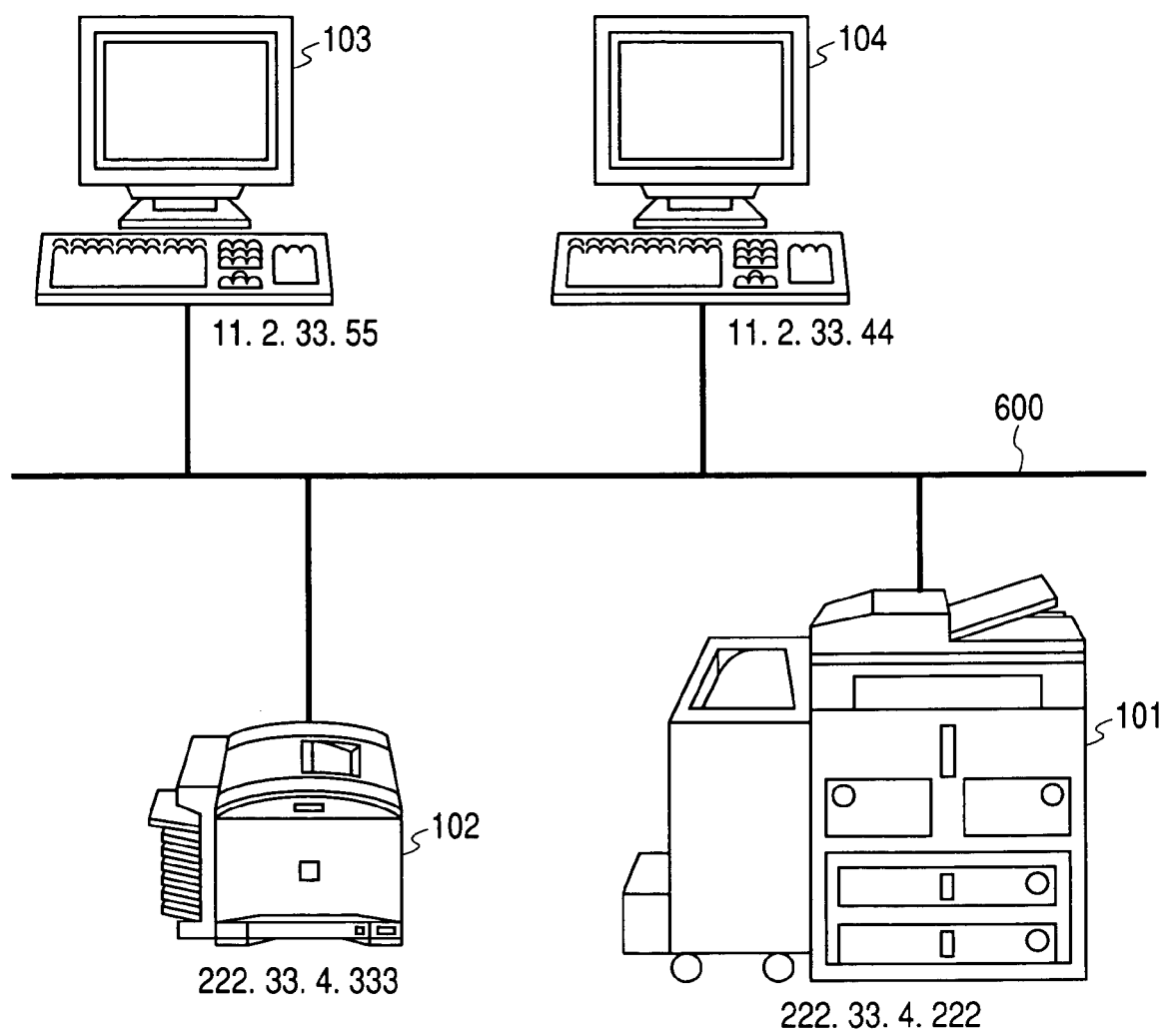
FIG. 1 is a diagram showing the configuration of a print processing system according to the first embodiment of the present invention.

FIG. 1 is a diagram showing the configuration of a print processing system (or simply called a print system, hereinafter) according to the first embodiment of the present invention, and ideally showing the configuration of the print system and a simple flow of a print process.

In FIG. 1, a document server (computer) 103 of which the IP (Internet Protocol) address is, e.g., "11.2.33.55" and a stock management server (computer) 104 of which the IP address is, e.g., "11.2.33.44" are connected to a LAN 600, and an image input/output apparatus (e.g., multifunctional device) 101 of which the IP address is, e.g., "222.33.4.222" and a printing apparatus (e.g., printer) 102 of which the IP address is, e.g., "222.33.4.333" are provided within the LAN 600. It should be noted that these apparatuses are used properly according to print speed, an image quality, presence/absence of finishing functions such as stapling, book binding, etc., and the like.

(Construction of Server)

Figure 2:
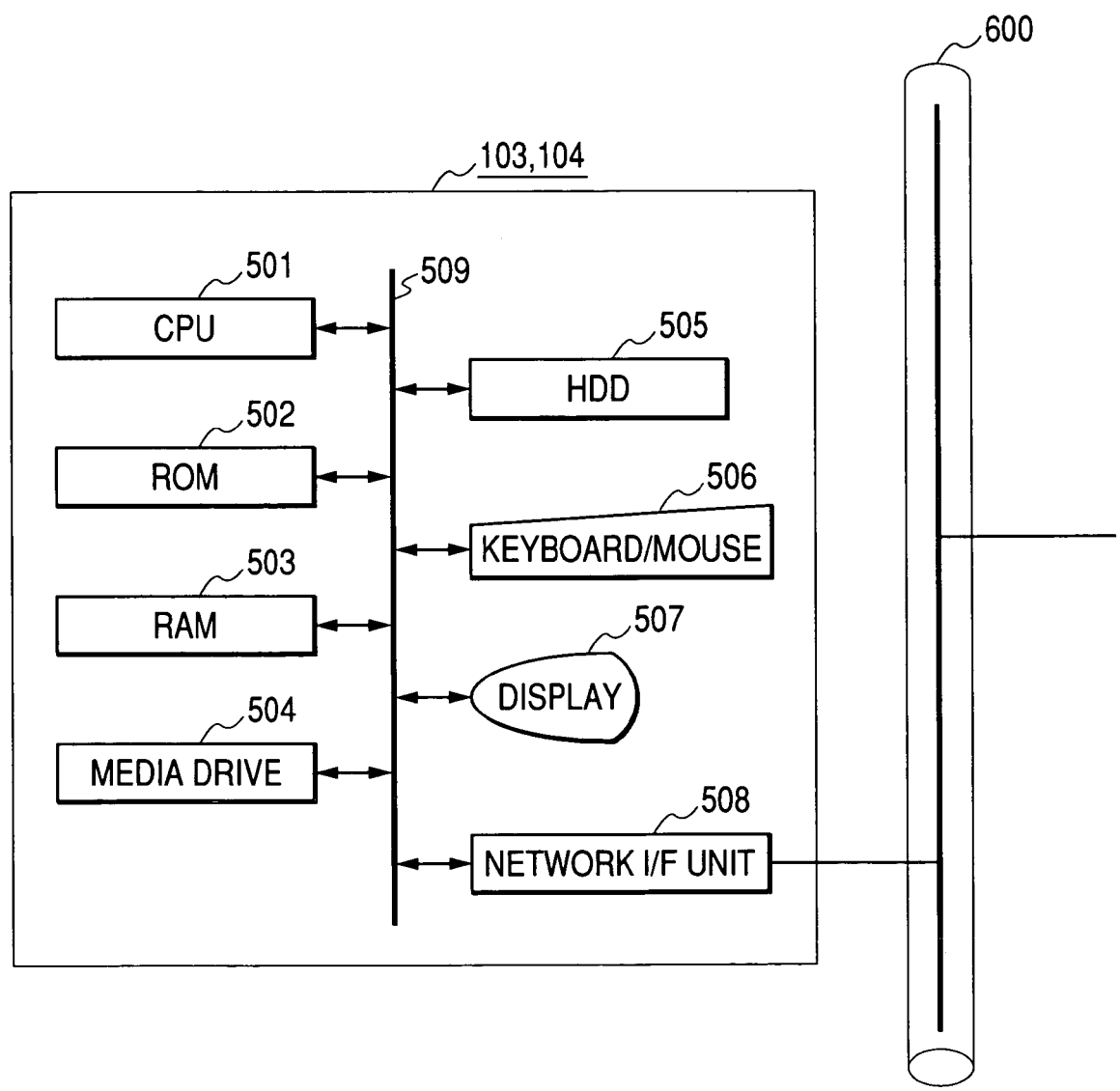
FIG. 2 is a block diagram for explaining the construction of the document server and the stock management server shown in FIG. 1.

FIG. 2 is a block diagram for explaining the construction of the document server 103 and the stock management server 104 shown in FIG. 1. In FIG. 2, the same parts as those shown in FIG. 1 are denoted respectively by the same reference numerals as those shown in FIG. 1.

In FIG. 2, numeral 501 denotes a CPU which totally controls the devices connected to a CPU but 509 on the basis of control programs (codes) stored in a ROM 502. Numeral 503 denotes a RAM which functions as a temporary memory for the CPU 501, and the memory capacity of the RAM 503 can be expanded by means of an option RAM connected to a not-shown additional port.

Besides, the RAM 503 is used as a memory which stores a drawing object created as print data, a working memory to be temporarily used by the control program stored in the ROM 502, and the like.

Numeral 504 denotes a media drive which acts as an access interface for various media such as a flexible disk, a CD, a DVD and the like, numeral 505 denotes an HDD (hard disk drive) which stores various programs, data and the like, numeral 506 denotes a keyboard/mouse which acts as an interface unit to receive various inputs from a user, numeral 507 denotes a display which acts as an output unit to send various information to a user, and numeral 508 denotes a network I/F (interface) unit which is used to bi-directionally communicate with peripherals such as the printer and the like through a network.

Numeral 509 denotes a CPU bus which includes an address bus, a data bus and a control bus. Thus, the ROM 502, the RAM 503, the media drive 504, the HDD 505, the keyboard/mouse 506, the display 507, and the network I/F unit 508 can respectively access all the devices connected to the CPU bus 509.

(Construction of Apparatus)

Figure 3:
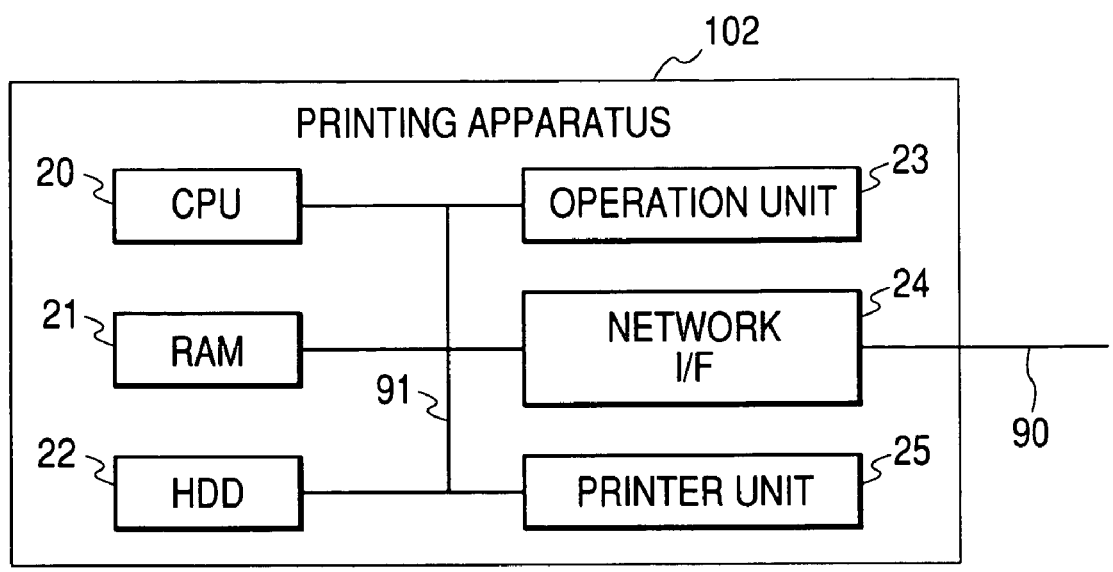
FIG. 3 is a block diagram for explaining the construction of the printer shown in FIG. 1.

FIG. 3 is a block diagram for explaining the construction of the printer 102 shown in FIG. 1.

In FIG. 3, numeral 20 denotes a CPU which totally controls the printer 101, numeral 21 denotes a RAM which functions as a working memory for holding programs and control data to be used to control the printer 102, and numeral 22 denotes an HDD which stores the control programs and data for a printer 3 (FIG. 4) and the data to be printed.

Numeral 23 denotes an operation unit which includes an LCD display to which a touch panel is attached. The operation unit 23 is used to display various information to a user, and accept the inputs from the user. Numeral 24 denotes a network I/F which communicates with external apparatuses, numeral 25 denotes a printer unit which functions as a printer engine to form images on paper, and numeral 90 denotes a network which functions as a data communication path for the external apparatuses. Numeral 91 denotes an internal bus which functions as a data communication path among the CPU 20, the RAM 21, the HDD 22, the operation unit 23, the network I/F 24 and the printer unit 25.

Moreover, the printer 102 includes a finishing function block which performs accumulation, stapling, book binding and job offset of papers print-processed through a copy function, a network printer function and the like, and also can sort and edit the processed papers in units of certain aggregate. Hereinafter, the operation of the printer 102 will be explained.

An operating system and a control program for controlling the printer 102 have been previously stored in the HDD 22 of the printer 102, and the operating system and the control program are read from the HDD 22 and transferred to the RAM 21 through the internal bus 91 when the printer 102 starts the operation. Then, the control program transferred and read by the RAM 21 is executed by the CPU 20.

Figure 4:
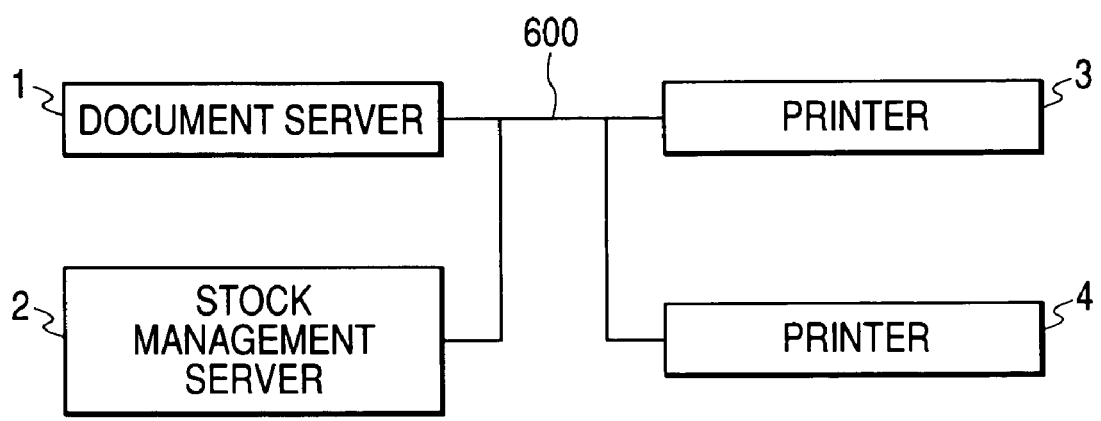
FIG. 4 is a schematic block diagram for explaining the construction of the print processing system according to the present invention.

FIG. 4 is a schematic block diagram for explaining the construction of the print processing system according to the present invention.

In FIG. 4, numeral 1 denotes a document server which stores and holds image data to print a document list of pamphlets, the contents of the pamphlets, and the like. Numeral 2 denotes a stock management server which manages the stock of the pamphlets in the warehouse, and numerals 3 and 4 denote printers which enable the user to select an appropriate document (pamphlet) on the document list and perform a delivery order or printing of the selected document. Numeral 600 denotes the network which acts as a data communication path among the document server 1, the stock management server 2, and the printers 3 and 4. In the present embodiment, the system for giving the plural kinds of pamphlets out to customers at the two business bases is constructed. Thus, at each business base, the pamphlets of some number are stocked, and the printer for performing printing is disposed. The pamphlets to be handled are mainly stocked in the warehouse at another location, and controlled and managed by the stock management server provided in the warehouse. Moreover, the list of the pamphlets and the print image data to be used to print the pamphlets are controlled and managed by the document server.

Figure 5:
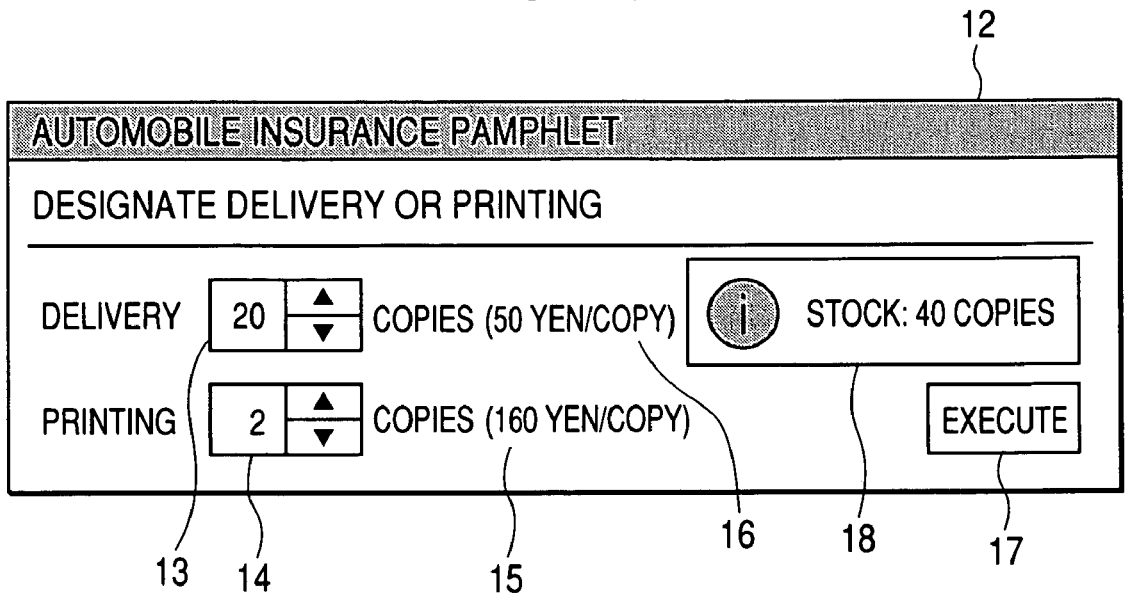
FIG. 5 is a diagram showing an example of a pamphlet print setting screen displayed on the operation unit of the printer shown in FIG. 4.

FIG. 5 is a diagram showing an example of a pamphlet print setting screen to be displayed on the operation unit of each of the printers 3 and 4 shown in FIG. 4.

In FIG. 5, numeral 12 denotes the pamphlet print setting screen which is displayed based on the display control to be performed to the operation unit 23 by the CPU 20 shown in FIG. 3 when, for example, an automobile insurance pamphlet is printed.

Numeral 13 denotes a delivery amount input section in which a desired amount (number) to be delivered is indicated and input by the user with use of an up key or a down key. Incidentally, the set amount (number) is stored and managed in the buffer of the RAM 21.

Numeral 14 denotes a print amount input section in which a desired amount (number of print copies) to be printed is indicated and input by the user with use of an up key or a down key.

Numeral 15 denotes a print unit price display section which displays a preset unit price of one copy of the document to be printed, numeral 16 denotes a printed material unit price display section which displays a preset unit price of one copy of the printed material to be delivered, numeral 18 denotes a stock amount display section which displays the amount of the stocked printed materials (pamphlets) notified from the stock management server 2, and numeral 17 denotes an execution button which is depressed to indicate the delivery and/or the printing.

Figure 19:
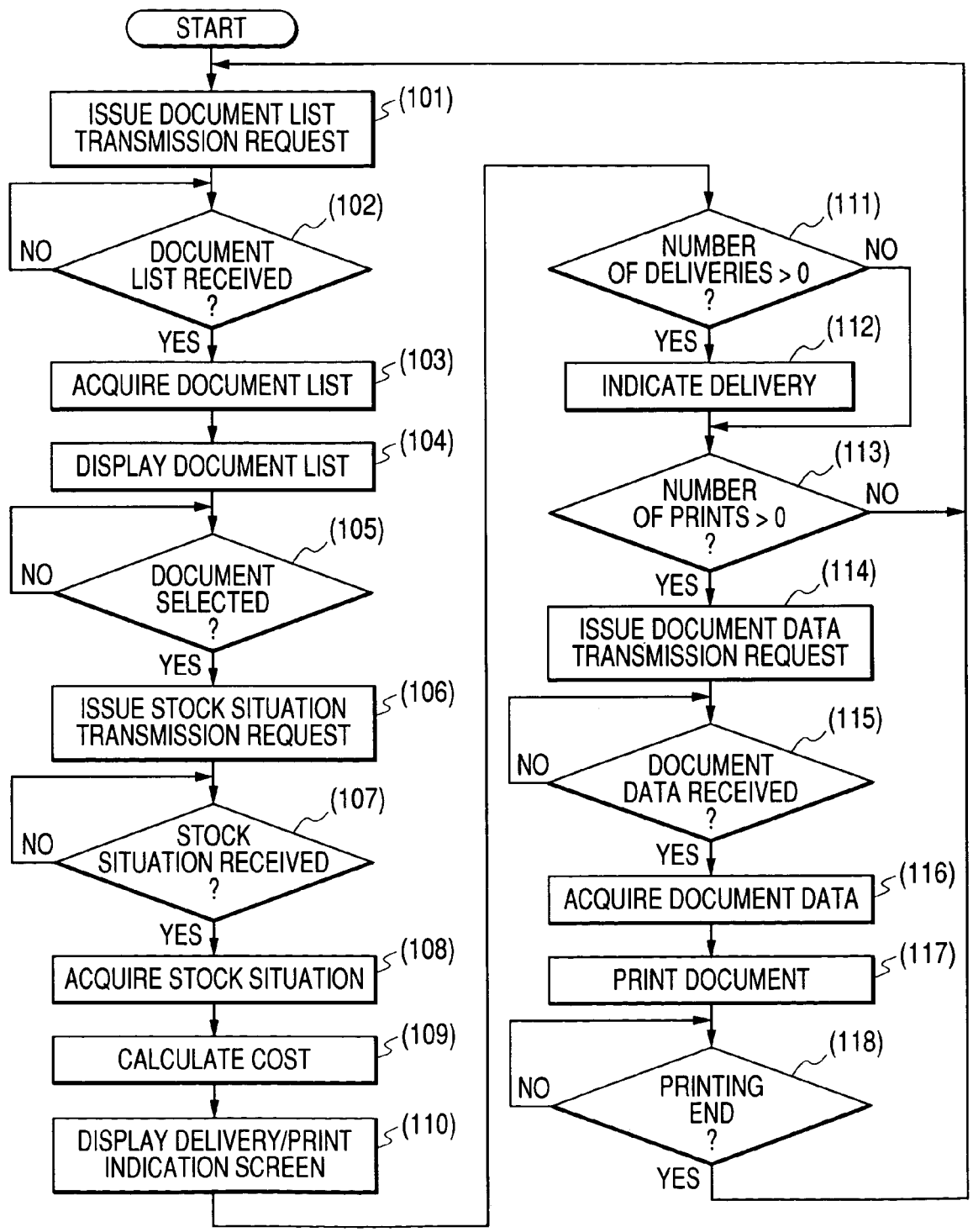
FIG. 19 is a flow chart showing an example of a fourth data processing procedure in the print processing system according to the present invention.

Incidentally, the stock amount stored in the RAM 21 in a later-described step (108) shown in FIG. 19 is displayed in the stock amount display section 18 under the control of the CPU 20, the unit price of the printed matter stored in the RAM 21 is displayed in the printed material unit price display section 16, and the cost necessary in case of printing the document of one copy by the printer 3 calculated in a later-described step (109) shown in FIG. 19 is displayed in the print unit price display section 15 under the control of the CPU 20.

Further, the delivery amount input section 13 functions as an input section to be used by the user to input a desired delivery amount when the delivery is indicated, and the print amount input section 14 functions as an input section to be used by the user to input a print amount when the printing is indicated.

Furthermore, the amount capable of being input in the delivery amount input section 13 is limited to the upper limit of the stock amount displayed in the stock amount display section 18 so as to prevent that the pamphlets of which the number exceeds the number of the stocked pamphlets are erroneously delivered. Moreover, in a case where the stock amount is "0", a screen as shown in FIG. 7 is displayed. This indicates "not in stock", and also disables the user from indicating the delivery by setting the delivery amount input section 13 to an input-disable state.

Figure 6:
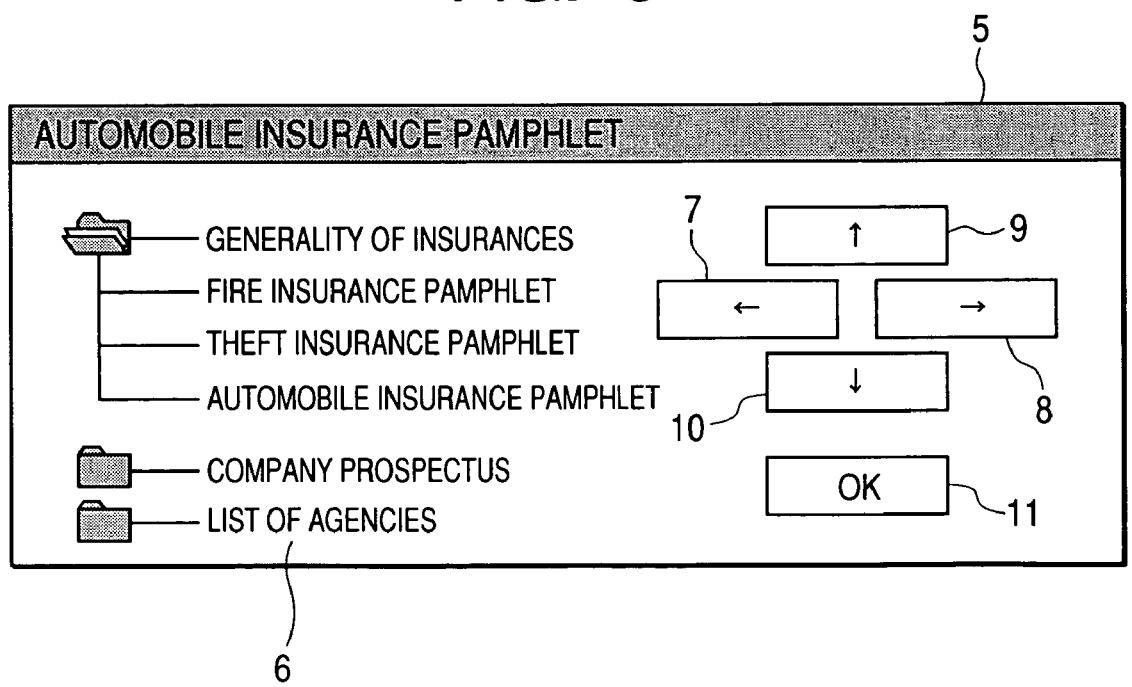
FIG. 6 is a diagram showing an example of a printable document file list selection screen displayed on the operation unit of the printer shown in FIG. 4.

FIG. 6 is a diagram showing an example of a printable document file list selection screen displayed on the operation unit of each of the printers 3 and 4 shown in FIG. 4. In the present embodiment, for example, a file name list which is managed by the document server 1 in the form of hierarchical file structure is displayed.

In FIG. 6, numerals 7 to 10 respectively denote buttons which are appropriately clicked or indicated by the user so as to be able to shift a not-shown cursor on a file name list (or document list display section) 6. Numeral 11 denotes an OK button which is clicked or indicated to decide the file name currently indicated by the cursor. That is, for example, if the automobile insurance pamphlet is selected as shown in FIG. 5, the relevant file name is displayed in the manner different from those for other file names.

Incidentally, the button 7 is the left shift button, the button 8 is the right shift button, the button 9 is the upward shift button, and the button 10 is the downward shift button.

FIG. 7 is a diagram showing an example of the pamphlet print setting screen displayed on the operation unit of each of the printers 3 and 4 shown in FIG. 4. Here, it should be noted that, in FIG. 7, the point different from the pamphlet print setting screen shown in FIG. 5 is that the stock amount display section 18 indicates "not in stock", and the same parts as those shown in FIG. 5 are denoted respectively by the same reference numerals as those shown in FIG. 5.

In the print processing system constructed as above, the respective operations in the document server 1, the stock management server 2 and the printer 3 will be first explained, and then the whole system operation including the data communication among these apparatuses will be explained.

First, the operation of the document server 1 will be explained.

The document server 1 is the server which controls and manages the plural document data in the HDD 505 or the like shown in FIG. 2. In this case, the document data is stored as a file in the format capable of performing image formation on paper (for example, as a PDL (page-description language) file).

Besides, the database for managing the respective document data operates in the HDD 505, and, in the database, the documents are managed in the data construction as shown in FIG. 8.

FIG. 8 is a diagram for explaining the data construction of the database in the document server 1 shown in FIG. 4.

In the present embodiment, as shown in FIG. 8, a document ID which uniquely specifies each document, a document name which is a character string in the displayed document list, number of pages which indicates the total number of pages included in the document, a path which indicates the data location of the document held in a boot means of the document server 1, and the like are managed by the database.

Further, in the document server 1, a document management program for processing a document list transmission request and a document data transmission request from an external apparatus runs on the RAM 503. Here, it should be noted that the document management program is used to control and manage the documents based on a later-described control procedure shown in FIG. 9.

Figure 9:
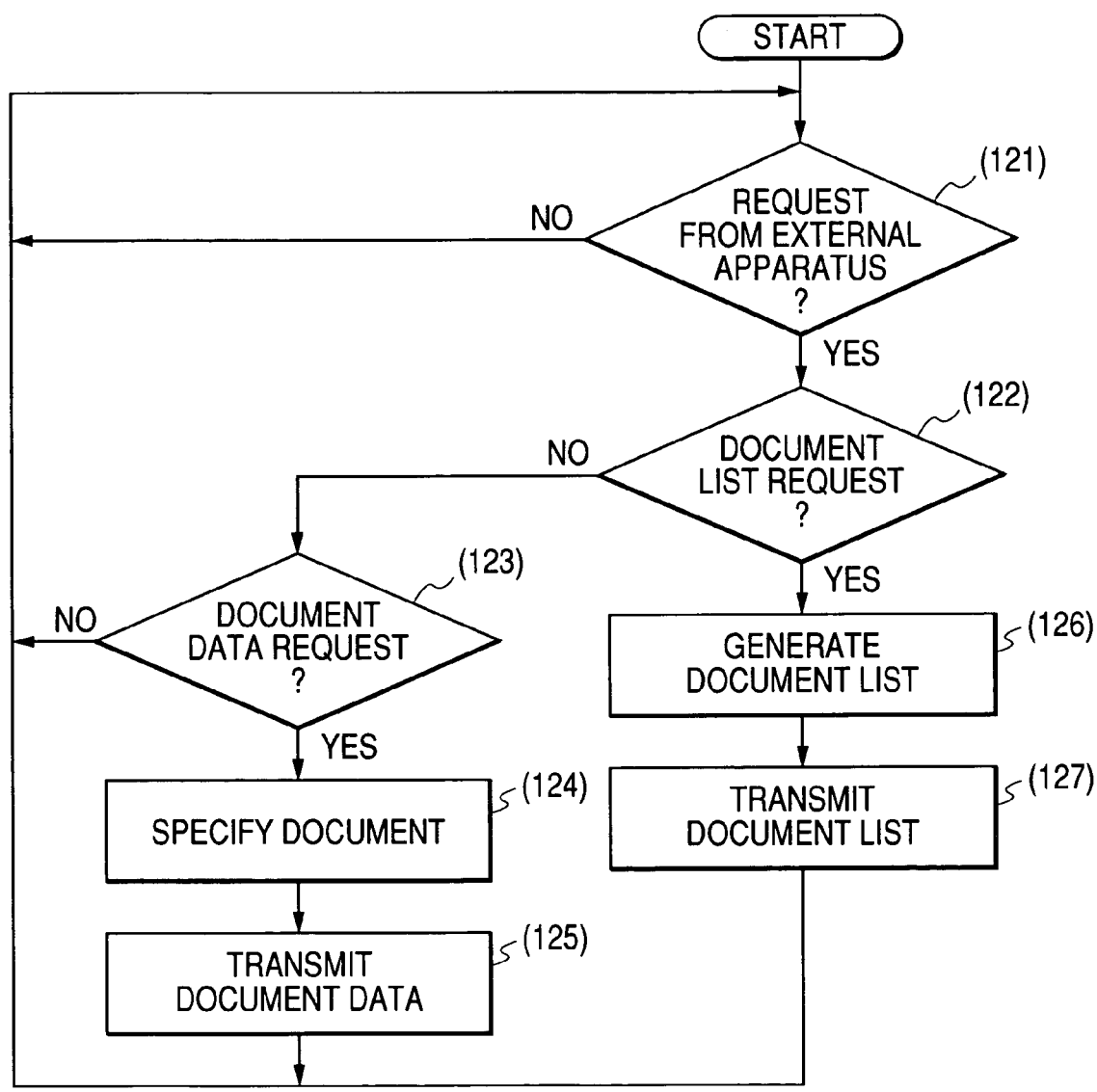
FIG. 9 is a flow chart showing an example of a first data processing procedure in the print processing system according to the present invention.

FIG. 9 is a flow chart showing an example of a first data processing procedure in the print processing system according to the present invention, and the first data processing procedure corresponds to the control procedure based on the document management program in the document server 1 of FIG. 4. Here, it should be noted that bracketed numerals (121) to (127) denote respective steps which correspond to the steps to be executed by loading the document management program from the HDD 505 onto the RAM 503 under the control of the CPU 501 shown in FIG. 2.

First, when the document server 1 starts the operation, the document management program is activated to judge whether or not the document list transmission request or the document data transmission request is issued from the external apparatus (including the printers 3 and 4) (121). Here, it should be noted that the step (121) is repeated until the request is issued.

Then, it is judged by the CPU of the document server 1 whether or not the request from the external apparatus is the document list transmission request. (122). When judged that the request from the external apparatus is not the document list transmission request, it is further judged by the CPU of the document server 1 whether or not the request from the external apparatus is the document data transmission request (123). When judged that the request from the external apparatus is not the document data transmission request, the flow returns to the step (121).

On the other hand, when judged in the step (123) that the request from the external apparatus is the document data transmission request, the location of the requested document data held in the storage means (e.g., HDD 505) of the document server 1 is acquired by using the database of the data structure shown in FIG. 8 from the document ID for specifying the document which is included in the document data transmission request and of which the transmission is requested, and the document data is specified based on the acquired location (124). Then, the requested document data is read from the storage means based on the acquired location of the request document data, and transmitted to the external apparatus such as the printer 3 or 4 which transmitted the document data transmission request (125), and the flow returns to the step (121).

In the meantime, when judged in the step (122) that the request from the external apparatus is the document list transmission request, plural pairs each consisting of the document ID and the document name relevant to each other are set in the database by using the database of the data structure shown in FIG. 8, and the list data of all the documents specified by the set pairs and registered as the databases in the HDD 505 is generated (126). Then, the generated document list data is transmitted to the external apparatus which transmitted the document list transmission request (127), and the flow returns to the step (121).

By such a control flow as described above, when the document data transmission request is transmitted from the external apparatus, the document server 1 specifies the document data based on the document ID for specifying the requested document, and transmits the specified document data to the external apparatus which issued the transmission request. Meanwhile, when the document list transmission request is transmitted from the external apparatus, the document server 1 generates the list data including the document ID's and the document names of all the documents registered on the database in the document server 1, and transmits the generated list data to the external apparatus which issued the transmission request.

Subsequently, the operation of the stock management server 2 will be explained.

The stock management server 2 acts as a server which controls and manages the stock of the printed materials such as the pamphlets and the like printed and delivered by the printing company and the like, and also acts as a cost management server which controls and manages the unit price with respect to each page in case of printing the pamphlet by using the printer disposed at each business base.

Moreover, the stock management server 2 has a function to transmit, in response to the inquiry as to the stock issued from the operation unit 23 of the printer 3 or 4, the information indicating the stock amount of the designated printed materials and the information indicating the cost necessary to print each page when the document is printed by the printer disposed at the inquiry source.

Incidentally, the function as the stock management server is achieved by processing the stock management database for managing the data based on the data construction shown in FIG. 10.

FIG. 10 is the diagram for explaining the data construction of the database in the stock management server 2 shown in FIG. 4, and the data construction shown in FIG. 10 is controlled and managed as the stock management database in the HDD 505 or the like shown in FIG. 2.

As shown in FIG. 10, in the present embodiment, the data construction of the stock management database includes "document ID" which uniquely specifies the document as the record for each printed material such as the stocked pamphlet or the like, "stock amount" which holds the stock amount of the relevant printed material (i.e., the number of stocked printed materials), "number of pages" which indicates the total number of pages of one copy of the relevant printed material, and "unit price" which holds the unit price of one copy of the relevant printed material.

Besides, the function as the cost management server is achieved by processing the cost management database for managing the data based on the data construction shown in FIG. 11.

FIG. 11 is the diagram for explaining the data construction of the cost management database in the stock management server 2 shown in FIG. 4, and the data construction shown in FIG. 11 is controlled and managed as the cost management database in the HDD 505 or the like shown in FIG. 2.

As shown in FIG. 11, in the present embodiment, the data construction of the cost management database is controlled and managed as the record for each business base at which the printer is disposed, and each record includes "base (business base)" at which the printer is disposed and "cost per page" which indicates the cost necessary to print each page when the document is printed by the printer disposed at the relevant base.

Incidentally, the management operations by an administrator are necessary to achieve a stock management server function and a cost management server function, and these operations are achieved by a single stock management program.

Figure 16:
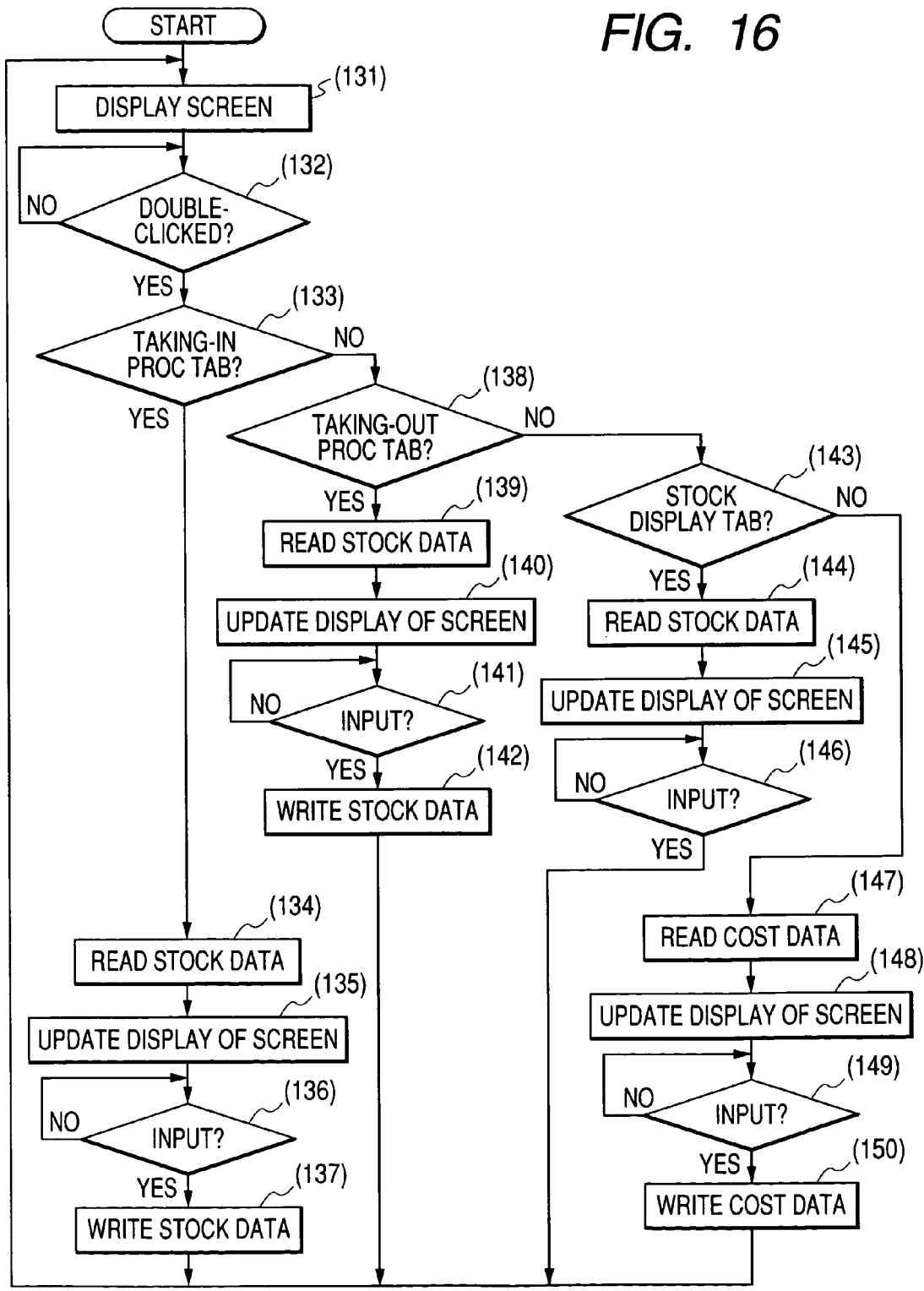
FIG. 16 is a flow chart showing an example of a second data processing procedure in the print processing system according to the present invention.

The stock management program is controlled according to a flow chart shown in FIG. 16, whereby it is possible to perform a take-in process in case of newly taking in the printed materials, a take-out process in case of taking out the stocked printed materials according to a stock sending request, a stock display process for confirming the stock amount, and an update process for updating the cost management database.

FIGS. 12 to 15 are diagrams showing examples of a stock management screen displayed on the display unit of the stock management server shown in FIG. 4. The stock management server 2 includes an interactive handling means (e.g., user interface (UI)) which is handled by the administrator, and an interactive process is controlled based on the stock management program.

Particularly, FIGS. 12 to 15 exemplify interactive screens displayed based on the stock management program.

In FIGS. 12 to 15, numeral 30 denotes a taking-in processing tab which functions as an indication unit to change the stock management screen to a taking-in processing screen, and numeral 31 denotes a taking-out processing tab which functions as an indication unit to change the stock management screen to a taking-out processing screen.

Numeral 32 denotes a stock display tab which functions as an indication unit to change the stock management screen to a stock display screen, and numeral 33 denotes a cost input tab which functions as an indication unit to change the stock management screen to a cost input screen.

Numeral 34 denotes a stock list display section which displays various items such as a document ID, a stock, number of pages, unit price, and the like, numeral 35 denotes a taking-in amount input/display section which displays number of took-in copies (i.e., a took-in amount) input through handling of an input device, and numeral 36 denotes an execution button which is clicked and indicated to execute or perform the various processes of the contents decided on the stock management screen.

Numeral 37 denotes a stock list display section which displays the stock list to be selected in a taking-out process, numeral 38 denotes a stock list display section which displays the stocks, and numeral 39 denotes a cost list display section which displays a cost data list in case of inputting costs. Numeral 40 denotes a taking-out amount input/display section which displays number of took-out copies (i.e., a took-out amount) input through handling of the input device, and numeral 41 denotes a cost input/display section which displays the costs and is used to input the costs.

Hereinafter, the control operation based on the stock management program of the stock management server 2 shown in FIG. 4 will be explained with reference to a flow chart shown in FIG. 16 and the displayed screens shown in FIGS. 12 to 15.

FIG. 16 is the flow chart showing an example of a second data processing procedure in the print processing system according to the present invention, and the second data processing procedure corresponds to the control procedure based on the stock management program in the stock management server 2 of FIG. 4. Here, it should be noted that bracketed numerals (131) to (150) denote respective steps which correspond to the steps to be executed by loading the stock management program from the HDD 505 onto the RAM 503 under the control of the CPU 501.

Figure 12:
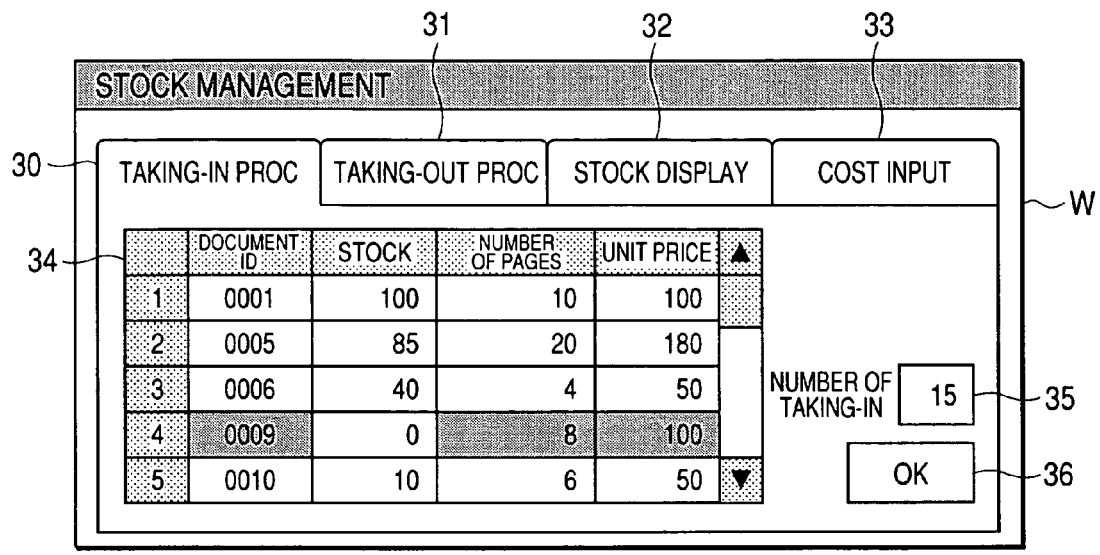
FIG. 12 is a diagram showing an example of a stock management screen displayed on the display unit of the stock management server shown in FIG. 4.

First, when the CPU of the stock management server 2 starts the operation, the stock management program is automatically activated to display the initial screen shown in FIG. 12 on the interactive handling means of the stock management server 2 (131). Here, it is assumed that the initial screen is the taking-in processing screen shown in FIG. 12.

Then, the CPU of the stock management server 2 repeatedly judges whether or not double clicking is performed until any one of the taking-in processing tab 30, the taking-out processing tab 31, the stock display tab 32 and the cost input tab 33 is selected (132).

Subsequently, it is judged whether or not the tab selected in the step (132) is the taking-in processing tab 30 (133). When judged that the selected tab is the taking-in processing tab 30, the stock data is read from the stock management database held and managed in the hard disk of the stock management server 2 (134).

Thus, based on the stock data read in the step (134), the document ID, the stock amount, number of pages of the relevant printed material, and the unit price of the relevant printed material which are necessary to specify the stocked document on the stock list display section 34 are displayed, and the taking-in amount input/display section 35 is displayed on the display of the stock management server 2 (135).

Next, the CPU of the stock management server 2 judges whether or not the execution button 36 is clicked or depressed (136). When judged that the execution button 36 is clicked or depressed, the CPU of the stock management server 2 adds the numeric value input to the taking-in amount input/display section 35 to the stock of the selected document and updates the stock management database (137). Then, the flow returns to the step (131).

Meanwhile, when judged in the step (133) that the selected tab is not the taking-in processing tab 30, the CPU of the stock management server 2 further judges whether or not the selected tab is the taking-out processing tab 31 (138). When judged that the selected tab is the taking-out processing tab 31, the stock data is read from the stock management database (139).

Figure 13:
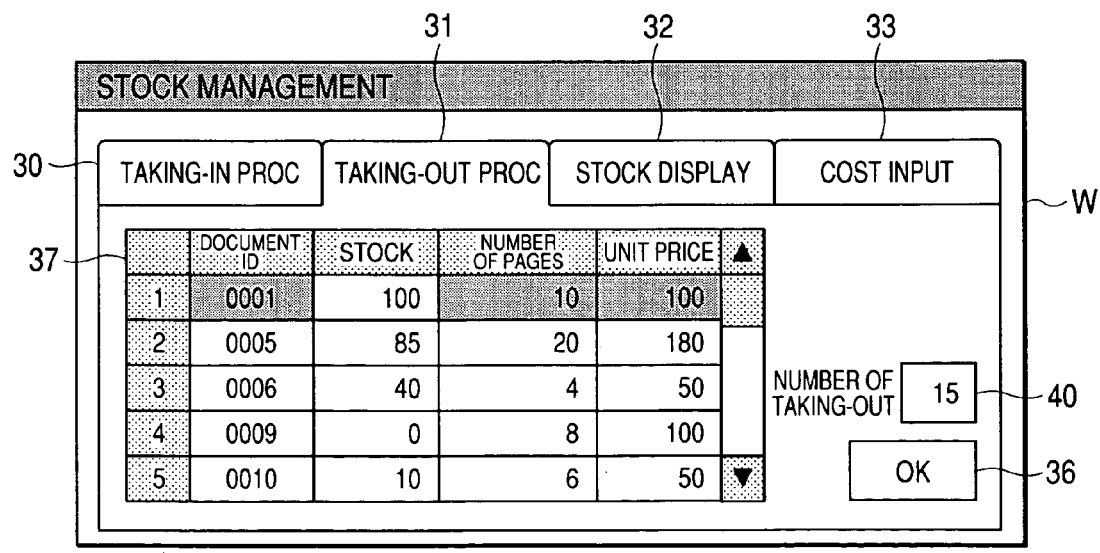
FIG. 13 is a diagram showing an example of the stock management screen displayed on the display unit of the stock management server shown in FIG. 4.

Then, based on the stock data read in the step (139), the CPU of the stock management server 2 displays the document ID, the stock amount, number of pages of the relevant printed material, and the unit price of the relevant printed material which are necessary to specify the stocked document on the stock list display section 37, and updates and displays the taking-out amount input/display section 40 as the screen shown in FIG. 13 (140). Subsequently, the CPU of the stock management server 2 judges whether or not the execution button 36 is clicked or depressed (141). When judged that the execution button 36 is clicked or depressed, the CPU of the stock management server 2 subtracts the numeric value input to the taking-out amount input/display section 40 from the stock of the selected document and updates the stock management database (142). Then, the flow returns to the step (131).

Meanwhile, when judged in the step (138) that the tab selected in the step (132) is not the taking-out processing tab 31, the CPU of the stock management server 2 further judges whether or not the selected tab is the stock display tab 32 (143). When judged that the selected tab is the stock display tab 32, the stock data is read from the stock management database of the stock management server 2 (144). Then, based on the read stock data, the CPU of the stock management server 2 displays the document ID, the stock amount, number of pages of the relevant printed material, and the unit price of the relevant printed material which are necessary to specify the stocked document on the stock list display section 37, and updates and displays the stock list display section 37 as the screen shown in FIG. 14 (145).

Subsequently, the CPU of the stock management server 2 judges whether or not the execution button 36 is clicked or depressed (146).

Meanwhile, when judged in the step (143) that the selected tab is not the stock display tab 32, the CPU of the stock management server 2 judges that the cost input tab 33 is selected, the cost data is read from the cost management database of the stock management server 2 (147). Thus, based on the read cost data, the cost for each page in the printing at the base (business base) at which the printer is disposed is displayed as the screen shown in FIG. 15, and the relevant cost is specifically displayed as the numeric value in the cost input/display section 41 (148).

Next, the CPU of the stock management server 2 judges whether or not the execution button 36 on the screen shown in FIG. 15 is clicked or depressed (149). When judged that the execution button 36 is clicked or depressed, the CPU of the stock management server 2 changes the cost data at the selected base to the numeric value input to the cost input/display section 41 and updates the cost management database (150).

By the above process, the stock management server 2 can freely manage the taking-in process to be performed when the printed materials are took in the warehouse, the taking-out process to be performed when the printed materials are took out of the warehouse, the stock display for confirming the stocks, and the cost data for each page in case of the printing at the base.

Moreover, the stock management server 2 has a function to transmit, in response to the inquiry as to the stock (called stock inquiry) issued from the operation unit 23 of the printer 3 or 4, the information indicating the stock amount of the designated printed materials and the information indicating the cost necessary to print each page when the document is printed by the printer disposed at the inquiry source. Incidentally, the function as the stock management server is achieved by a stock confirmation program running independently of the stock management program.

Figures 17, 18:
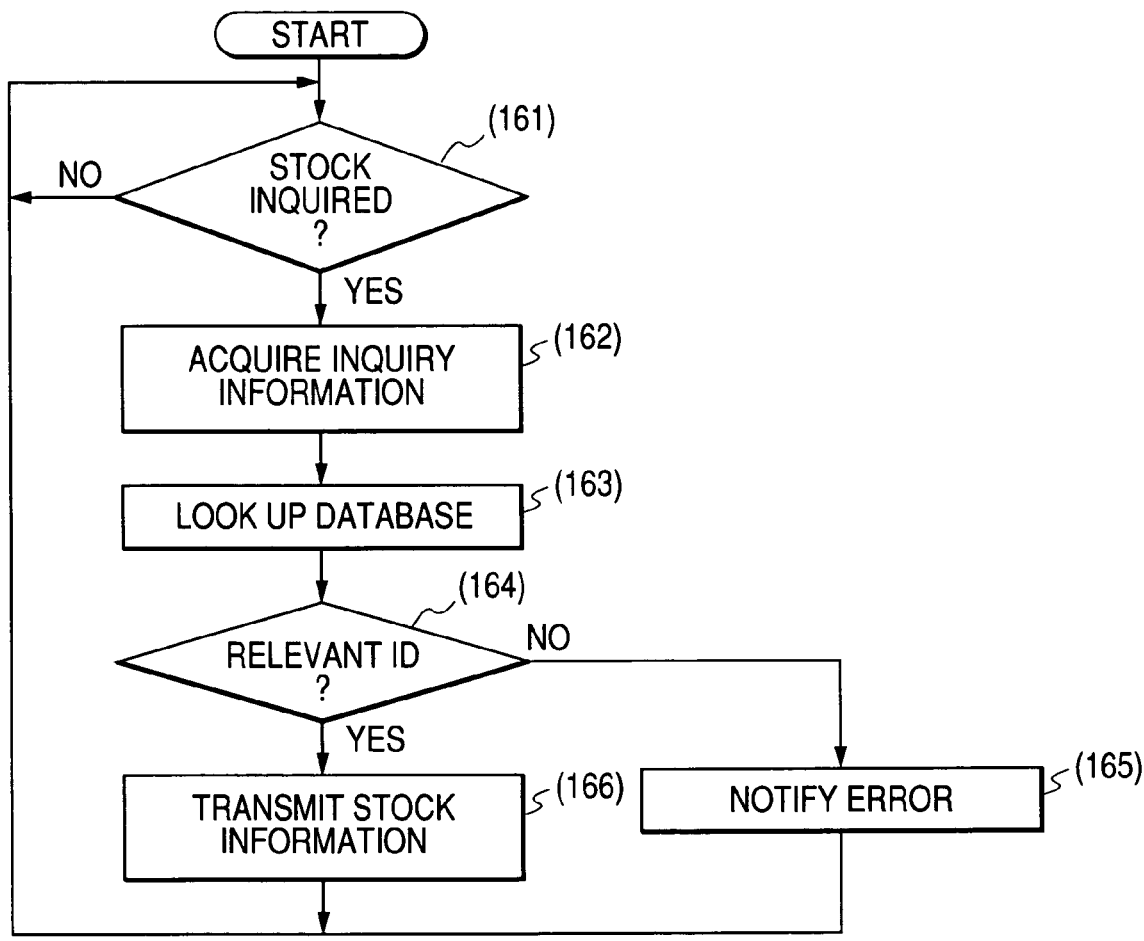
FIG. 17 is a flow chart showing an example of a third data processing procedure in the print processing system according to the present invention.
FIG. 18 is a diagram showing the data construction of the stock data transmitted from the stock management server shown in FIG. 4.

FIG. 17 is the flow chart showing an example of a third data processing procedure in the print processing system according to the present invention, and the third data processing procedure corresponds to the control procedure based on the stock confirmation program in the stock management server 2 of FIG. 4. Here, it should be noted that bracketed numerals (161) to (166) denote respective steps which correspond to the steps to be executed by loading the stock confirmation program from the HDD 505 onto the RAM 503 under the control of the CPU 501 of the stock management server 2.

First, when the CPU of the stock management server 2 starts the operation, the stock confirmation program is automatically activated to wait for the stock inquiry from the external apparatus such as the printer 3 or 4 shown in FIG. 4 (161).

Then, the information indicating which document ID the printed material concerning the stock inquiry sent from the external apparatus is directed to is acquired (162), and the stock information of the document having the acquired document ID is acquired from the stock management database (163).

Subsequently, it is judged whether or not the document corresponding to the document ID acquired by looking up the stock management database in the step (163) exists in, e.g., the warehouse (164). When judged that the document does not exist, the CPU of the stock management server 2 notifies the external apparatus from which the stock inquiry was issued that the relevant document does not exist (165), and the flow returns to the step (161).

Meanwhile, when judged in the step (164) that the document corresponding to the acquired document ID exists, the stock information indicating the document acquired from the stock management database in the step (163) is transmitted to the external apparatus from which the stock inquiry was issued (166), and the flow returns to the step (161).

By the above process, when the stock inquiry concerning the printed material of the specific document ID is transmitted from the external apparatus, it is possible to transmit the stock information to the relevant external apparatus by referring to the stock data held and stored in the stock management database in the stock management server 2.

Incidentally, it should be noted that the data to be transmitted to the external apparatus has the data construction as shown in FIG. 18.

FIG. 18 is the diagram showing the data construction of the stock data transmitted from the stock management server 2 shown in FIG. 4.

As shown in FIG. 18, the data construction of the data to be transmitted to the external apparatus includes the designated document ID, the stock amount of the relevant printed material (i.e., the number of stocked printed materials), the unit price of each copy of the relevant printed material, the unit price of the printed page which is equivalent to the cost per page necessary in case of printing the document by using the relevant external apparatus, and the number of pages included in the printed material.

Incidentally, it should be noted that the document ID, the stock amount, the number of pages and the unit price of the printed material are acquired by referring to the stock management database, and the unit price of the printed page is acquired by referring to the cost management database.

Hereinafter, a POD (print on demand) process in each of the printers 3 and 4 shown in FIG. 4, and the like will be explained.

FIG. 19 is a flow chart showing an example of a fourth data processing procedure in the print processing system according to the present invention, and the fourth data processing procedure corresponds to the control procedure based on the control program in each of the printers 3 and 4 shown in FIG. 4, and the like. Here, it should be noted that bracketed numerals (101) to (118) denote respective steps which correspond to the steps to be executed by loading the control program from the HDD 22 onto the RAM 21 under the control of the CPU 20 of each of the printers 3 and 4.

Besides, it should be noted that it is controlled based on the control program to display the image on the display means of the operation unit 23 shown in FIG. 3, process the input from the input means of the operation unit 23, communicate with the external apparatus through the network I/F 24, transfer the image data to the printer unit 25, and cause the printer unit 25 to form the image on paper. Hereinafter, although the operation of the printer 3 will be explained, the operation of the printer 4 is the same as that of the printer 3.

First, when the printer 3 starts the operation, the control program is automatically activated, whereby the document list transmission request is transmitted to the document server 1 through the network I/F 24 and the network 90 (101). Then, it is judged whether or not the document list is received from the document server 1 (102).

That is, it is judged whether or not the data of the document list is received from the document server 1 through the network 90 and the network I/F 24 (102). Then, when the document list is acquired (103), the acquired document list is temporarily stored in the RAM 21.

Next, the CPU 20 generates the screen data to be displayed on the operation unit 23 from the document list stored in the RAM 21, and actually displays the generated data on the operation unit 23 (104).

Incidentally, the configuration of the screen to be displayed on the operation unit 23 is shown in FIG. 6, that is, the list of documents is displayed in the document list display section 6.

For example, in FIG. 6, the user can select any one of the documents displayed in the document list display section 6 by appropriately handling the left shift button 7, the right shift button 8, the upward shift button 9 and the downward shift button 10.

Then, it is judged whether or not the document is selected by clicking or indicating the OK button 11 (105). When judged that the document is selected, a stock situation transmission request to which the document ID of the selected document has been added is issued to the stock management server 2 (106).

Subsequently, it is judged whether or not a stock situation is transmitted from the stock management server 2 (107).

When the stock situation is transmitted from the stock management server 2, the transmitted stock situation is received through the network 90 and the network I/F 24, and the received stock situation is temporarily stored in the RAM 21 (108). Incidentally, it should be noted that the data indicating the stock situation includes the document ID, the stock amount, the unit price of the relevant printed material, the unit price of the printed page, and the number of pages as shown in FIG. 18.

Next, the CPU 20 calculates the cost necessary to print the document of one copy by the printer 3, on the basis of the number of pages of the relevant document and the unit price of one page of the relevant document printed by the printer 3 both included in the information indicating the stock situation stored in the RAM 21 (109).

After then, in the step (110), the CPU 20 causes the operation unit 23 to display a delivery/print indication screen, on the basis of the stock situation stored in the RAM 21 in the step (108) and the cost calculated in the step (109).

Incidentally, the configuration of the delivery/print indication screen to be displayed on the operation unit 23 is shown in FIG. 5.

When the execution button 17 is selected, the values input to the delivery amount input section 13 and the print amount input section 14 are acquired, and it is then judged by the CPU 20 whether or not the value input to the delivery amount input section 13 is larger than "0" (111). Namely, when judged that the value input to the delivery amount input section 13 is not larger than "0", the flow advances to the step (113).

Meanwhile, when judged in the step (111) that the value input to the delivery amount input section 13 is larger than "0", the CPU 20 executes a delivery indication by using the value input to the delivery amount input section 13 as a delivery request amount (i.e., number of the documents requested to be delivered) (112).

More specifically, the document ID of the document selected in the step (104) and the delivery request amount are transmitted as the delivery request data to the stock management server 2 through the network I/F 24 and the network 90.

Then, it is judged by the CPU 20 whether or not the value input to the print amount input section 14 is larger than "0" (113). Namely, when judged that the value input to the print amount input section 14 is not larger than "0", the flow returns to the step (101).

Meanwhile, when judged in the step (113) that the value input to the print amount input section 14 is larger than "0", the document data transmission request for requesting the document server 1 to transmit the document data indicating the document of the relevant document ID based on the document ID of the document selected in the step (104) as the number for specifying the document is transmitted to the document server 1 through the network I/F 24 and the network 90 (114).

Then, it is judged whether or not the document data is transmitted from the document server 1 (115). When the document data transmitted from the document server 1 is received through the network 90 and the network I/F 24 (116), the received data is temporarily stored in the HDD 22.

Next, the document data stored in the HDD 22 in the step (116) is transferred to the RAM 21. When the document data is further transmitted from the RAM 21 to the printer unit 25, papers previously set in the paper cassette of the printer unit 25 are fed one by one, and the image formation is performed on the fed paper in response to the image data generated based on the document data (117).

Subsequently, it is judged in the printer unit 25 whether or not the printing ends (118). When the printing ends, the CPU 20 returns the flow to the step (101).

Under the above control, the document list is acquired from the document server 1, the acquired document list is displayed on the operation unit 23 of the printer 3 or 4, the document is selected by the user from the displayed document list, the stock information of the printed material of the selected document is inquired to the stock management server 2, the stock information is transmitted from the stock management server 2 in response to the stock information inquiry, the stock amount and the unit price of the printed material and the unit price in case of printing the document are displayed based on the transmitted stock information, an order process of the input delivery amount is performed, and the document printing of the input print amount is performed.

Next, the operation of the whole system including the communication procedures among the document server 1, the stock management server 2 and the printer 3 will be explained with reference to FIGS. 9, 17 and 19.

When the printed material such as a pamphlet or the like becomes insufficient at the business base at which the printer 3 is located, the user at this base starts the printer 3. Then, when the printer 3 starts the operation, the document list transmission request is transmitted to the document server 1 through the network I/F 24 and the network 90 in the step (101).

When the document list transmission request from the external apparatus (i.e., the printer 3 in this case) is received, the document server 1 executes the steps (121), (122), (126) and (127) shown in FIG. 9 to transmit the document list data to the printer 3 which issued the document list transmission request.

Then, the printer 3 executes the steps (102), (103) and (104) shown in FIG. 19 to display the document selection window (printable document file list selection screen) shown in FIG. 6 on its operation unit 23.

Subsequently, when the user selects the document name of the insufficient printed material by handling the operation unit 23, the printer executes the steps (105) and (106), whereby the stock situation transmission request to which the document ID of the selected document has been added is transmitted from the printer 3 to the stock management server 2 through the network I/F 24 and the network 90.

Next, when the stock situation transmission request is received from the printer 3, the stock management server 2 executes the steps (161) and (162) shown in FIG. 17 to specify which printed material is inquired, based on the document ID included in the received stock situation transmission request. Then, the stock management server 2 further executes the step (163) to acquire the information concerning the document specified by the relevant document ID form the stock management database.

Subsequently, the stock management server 2 executes the steps (164) and (165) to transmit, as stock situation data of the data construction shown in FIG. 18, the acquired information to the printer 3 which issued the stock situation transmission request through the network 90.

Incidentally, the unit price of the print page in the stock situation data is determined by referring to the cost data, in the cost management database, of the base at which the printer 3 is located, and the document ID is determined by referring to the document ID added to the stock situation transmission request issued from the printer 3, the stock amount and the stock management database of displaying the unit prices of the printed materials.

When the stock situation data is received from the stock management server 2, the printer 3 executes the steps (107), (108), (109) and (110) shown in FIG. 9 to cause the operation unit 23 to display the delivery/print indication screen shown in FIGS. 5 to 7 based on the received stock situation data.

At that time, the delivery/print indication screen is appropriately displayed according to the stock situations. More specifically, the screen shown in FIG. 5 is selected and displayed when there is the stock, and the screen shown in FIG. 7 is selected and displayed to inhibit input of the delivery indication when there is no stock. Moreover, it is controlled to limit the value to be input to the delivery amount input section 13 so that the upper limit of the delivery amount does not exceed the stock amount.

Then, when the execution button 17 is clicked or indicated, the delivery indication of the delivery amount input to the delivery amount input section 13 is executed in the step (112) of FIG. 19. Here, the delivery indication is executed by transmitting, as the delivery request data, the document ID of the document selected in the step (104) and the delivery request amount to the stock management server 2 through the network I/F 24 and the network 90.

Thus, when the delivery indication is received from the printer 3, the stock management server 2 notifies the user of the received delivery indication. Then, the user of the stock management server 2 takes the printed materials of the indicated amount specified by the indicated document ID out of the warehouse and physically delivers the took-out printed materials to the business base at which the printer 3 is disposed. After then, the user of the stock management server 2 performs the taking-out process according to the stock management program, and thus updates the stock amount managed by the stock management database.

On-one hand, the printer 3 executes the steps (113) to (118) shown in FIG. 19. Thus, when the value input to the print amount input section 14 is not "0", the printer 3 requests the document server 1 to transmit the document data of the document specified by the selected document ID, and then performs the image formation process based on the document data transmitted from the document server 1.

Herewith, in the system which is constructed to deliver the plural kinds of pamphlets at the two bases, some amount of pamphlets are stocked at each base, the printer 3 (or 4) for printing the pamphlets is disposed at each base, the pamphlets to be distributed are mainly stocked in the warehouse at another location (different from the two bases), the stocks in the warehouse are managed by the stock management server 2, and the list of the pamphlets and the print image data necessary to print the pamphlets are managed by the document server 1. In such a circumstance, according to the present embodiment, when the printed materials such as the pamphlets or the like become insufficient, it is possible to easily deliver the printed materials stocked in the warehouse, and it is also possible to cause the printer 3 (or 4) to print the pamphlets by appropriately controlling the operation unit of the printer 3 (or 4) according to the stock amount in the warehouse.

That is, in the present embodiment, because both the delivery amount and the print amount can be properly input on the same screen, for example, it is possible to easily indicate to print the pamphlets of urgently necessary number and deliver the remainder of the pamphlets in a balanced manner. Further, it is also possible to flexibly request the printing and the delivery at the discretion of the user. In conclusion, according to the present embodiment, it is possible to achieve the above specific effects.

Second Embodiment

In the first embodiment, the example that the stock-managed printed materials (including the pamphlets) are ordered from the printer 3 or 4 is explained. However, for example, the present invention is also applicable to an information medium issue system concerning another medium (e.g., CD (compact disk)). In the second embodiment, the above information medium issue system will be explained hereinafter.

Figures 20, 21:
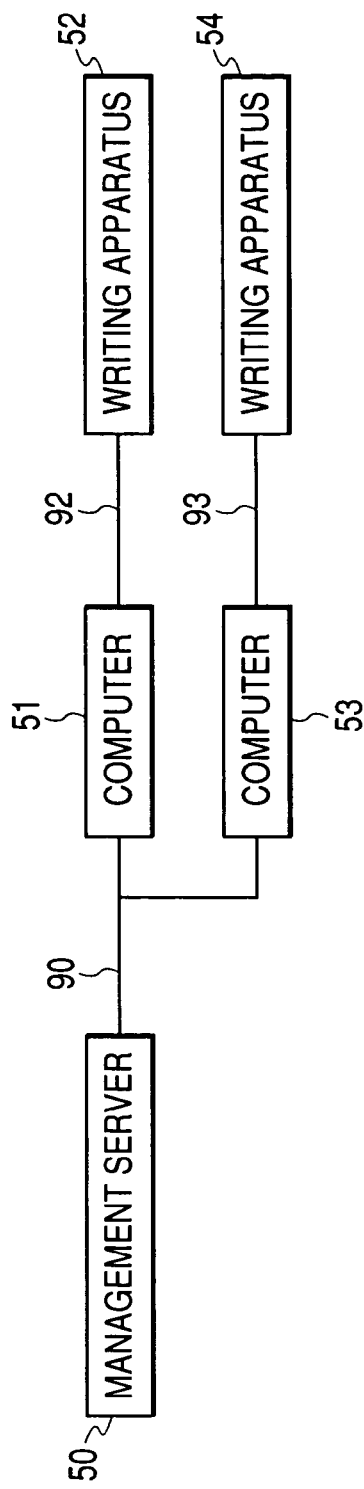
FIG. 20 is a diagram showing the configuration of a print processing system according to the second embodiment of the present invention.
FIG. 21 is a diagram showing the data construction of the stock database managed by the management server shown in FIG. 20.

FIG. 20 is a diagram showing the configuration of a print processing system according to the second embodiment of the present invention. For example, this print processing system is constructed to deliver plural kinds of CD's to customers at two business bases.

It should be noted that the print processing system in the present embodiment is applied not only to a case where a user who orders a CD initially creates (or produces) a master CD and then sends the created mater CD to a manufacturer to manufacture the same CD's, but also to a case where the user writes necessary data onto a CD-R medium or a CD-RW medium by using a CD writing apparatus having CD writing data.

In the case where the user orders the manufacture of the same CD's to the outside manufacturer, when the order amount is large, the unit price of the manufactured CD's can be low. However, when the order amount is low, the unit price of the manufactured CD's is high, whereby making the CD's with the CD writing apparatus can lower the unit price.

For this reason, the present embodiment provides a system in which some amount of CD's manufactured by the CD manufacturer are stocked at each base, the computer and the CD writing apparatus for making the CD's by writing data onto the CD-R media are disposed at each base, some amount of the manufactured CD's are stocked in a warehouse at another location (different from the two bases), the stocks in the warehouse are managed by a management server, and the CD writing data is stored and managed by the management server. According to this system, when the stocks of the CD's become insufficient at each base, it is possible to selectively request the delivery of the CD's stocked in the warehouse or write the CD writing data directly onto the CD-R by using the CD writing apparatus, whereby it is possible to effectively eliminate stock shortage.

In FIG. 20, numeral 50 denotes the management server which is equipped with the hardware shown in FIG. 2 and able to communicate with computers 51 and 53 through a network 90 based on a predetermined protocol. Here, it is assumed that, in the management server 50, various kinds of programs for controlling and managing the CD writing data and the stocks of the manufactured CD's are stored in the HDD 505 or the like. In any case, each of the computers 51 and 53 executes the delivery order of the CD's and causes the writing apparatus to make the CD's.

Numerals 52 and 54 respectively denote the writing apparatuses (or CD-R writing apparatuses) which write the data onto the CR-R media or the CD-RW media respectively under the control of the computers 51 and 53. Numeral 90 denotes the network which functions as a data communication path for the management server 50, the computer 51 and the computer 53. Numeral 92 denotes an I/F cable which functions as a data transfer path for the computer 51 and the writing apparatus 52, and numeral 93 denotes an I/F cable which functions as a data transfer path for the computer 53 and the writing apparatus 54.

First, the management server 50 according to the present embodiment will be explained.

The management server 50 is a general server which is equipped with the hardware as shown in FIG. 2. That is, the CPU 501 which executes the programs, the RAM 502 which acts as a storage area, the HDD 505 which stores various data, the network I/F unit 508 which is used to communicate with an external apparatus, and the like are included in the management server 50.

Besides, in the management server 50, following software technique and databases are provided.

More specifically, a management database for managing the stock of the CD's manufactured by the CD manufacturer and stocked in the warehouse and further managing the CD writing data to be used to make the CD's by the computer and the writing apparatus disposed at each base, and a delivery time database for managing a delivery time (or duration of delivery) necessary to deliver the CD's stocked in the warehouse to each base are provided on the HDD 505. In addition, a management database operation program for operating the management database, a delivery time database operation program for operating the delivery time database, a title list/data processing program for transmitting a title list of the CD's in response to the a CD title list transmission request from the external apparatus and further transmitting the CD writing data in response to a CD writing data transmission request from the external apparatus, and a stock information communication program for transmitting CD stock information in response to a CD stock information inquiry from the external apparatus are provided on the HDD 505. The CPU 501 loads these programs onto the program RAM 502, and thus performs a database retrieval process and/or a management process with respect to the databases on the HDD 505.

FIG. 21 is a diagram showing the data construction of the stock database managed by the management server 50 shown in FIG. 20.

In the present embodiment, the stock database shown in FIG. 21 is the database for managing the CD's manufactured by the CD manufacturer and the CD writing data to be used to make the CD's. More specifically, on the database, an ID, a title, a stock amount, and path data are recorded with respect to each CD title.

Here, the ID indicates a unique number for specifying the title of the CD, the title is a character string for specifying the title of the CD for which the delivery or the making is performed by the user, the stock amount indicates the stock amount of the CD's (the number of the CD's) manufactured by the CD manufacturer and stocked in the warehouse, and the path (path data) indicates the location on the HDD where the CD writing data to be used as the origin for making the CD's with the writing apparatus has been stored.

The management database is updated based on the management database operation program, and is referred based on the title list/data processing program and the stock information communication program.

Next, the delivery time database will be explained.

FIG. 22 is a diagram showing the data construction of the delivery time database managed by the management server 50 shown in FIG. 20.

In the present embodiment, the delivery time database shown in FIG. 22 is the database for managing predicted dates which are necessary to deliver the CD's stocked in the warehouse to the base which issued the delivery request. More specifically, on the delivery time database, the predicted date (i.e., duration) necessary for the delivery is recorded with respect to each of the bases.

The delivery time database is updated based on the delivery time database operation program, and is referred based on the stock information communication program.

Next, the management database operation program will be explained hereinafter.

The management database operation program which is the program for updating the data of the management database is operated and handled by the user through operation screens as illustrated in FIGS. 23 to 26.

That is, FIGS. 23 to 26 are the diagrams respectively showing examples of the operation screens displayed on the display unit of the management server 50 shown in FIG. 20. Here, it is controlled by the CPU 501 or the like to appropriately change or select the stock management screen (FIG. 23), a new title screen W11 (FIG. 24), a taking-in screen W12 (FIG. 25) and a taking-out screen W13 (FIG. 26).

In FIG. 23, numeral 81 denotes a record list which is a list display example of the records registered in the management database. In particular, it is possible by selecting the line of each record with use of the keyboard/mouse 506 to operate or handle the relative record.

Numeral 83 denotes a new title button which is clicked or indicated by the user to create a new title, i.e., a new record, and numeral 84 denotes a title deletion button which is clicked or indicated by the user to delete the record selected on the record list 81.

Numeral 85 denotes a taking-in button which is clicked or indicated by the user to perform the taking-in process of the CD's of the record selected on the record list 81, and numeral 86 denotes a taking-out button which is clicked or indicated by the user to perform the taking-out process of the CD's of the record selected on the record list 81.

In a case where the new title is added based on the management database operation program, the new title button 83 is selected by the user with use of the keyboard/mouse 506 on a screen 80 shown in FIG. 23, whereby the new title input window (screen) W11 shown in FIG. 24 is displayed. Then, on the window (screen) W11, a newly registered title name, and a location of the writing data file on the HDD in case of the data writing on the relevant CD through the writing apparatus are input as the path name by using the keyboard/mouse 506, whereby the new title is registered in the database by the CPU 501.

In a case where the title is deleted, the title intended to be deleted is first selected from the record list 81, and title deletion button 84 is selected by the user with use of the keyboard/mouse 506, whereby the record of the selected title is deleted.

When the CD was took in, the took-in CD is selected in the record list 81, and the taking-in button 85 is further selected by the user with use of the keyboard/mouse 506, whereby it is controlled to display the taking-in window (screen) W12 shown in FIG. 25 on the display 507. Then, when the numeric value corresponding to the taking-in amount is input by using the keyboard/mouse 506, the CPU 501 adds the input numeric value to the stock amount of the selected record in the record list 81 and then controls the calculated value to be displayed on the screen.

Meanwhile, when the CD is took out, the CD to be took out is selected in the record list 81, and the taking-out button 86 is further selected by using the keyboard/mouse 506, whereby it is controlled to display the taking-out window (screen) W13 shown in FIG. 26 on the display 507. Then, when the numeric value corresponding to the taking-out amount is input, the input numeric value of the taking-out amount is subtracted from the stock amount of the selected record in the record list 81 and it is then controlled to display the calculated value on the screen. Thus, the stocks of the CD's in the warehouse are managed by the CPU 501 of the management server 50.

Next, various data processes based on the delivery time database operation program running on the management server 50 will be explained.

FIG. 27 is a diagram showing an example of the operation screen displayed on the display unit of the management server 50 shown in FIG. 20. Here, it should be noted that a delivery time management screen W14 shown in FIG. 20 is switched under the control of the CPU 501 or the like.

The delivery time database operation program is executed by the CPU 501 to operate and handle the records of the delivery time database, and the various processes are indicated by the user on the displayed delivery time management screen shown in FIG. 20.

For example, when the user wishes to update the delivery time (duration), the user selects the line of the record intended to be updated, inputs a new delivery time to the relevant business base, and then clicks or selects the OK button. By doing so, the delivery time database is updated.

Hereinafter, the data process to be performed based on the title list/data processing program will be explained in detail.

Figures 28, 29:
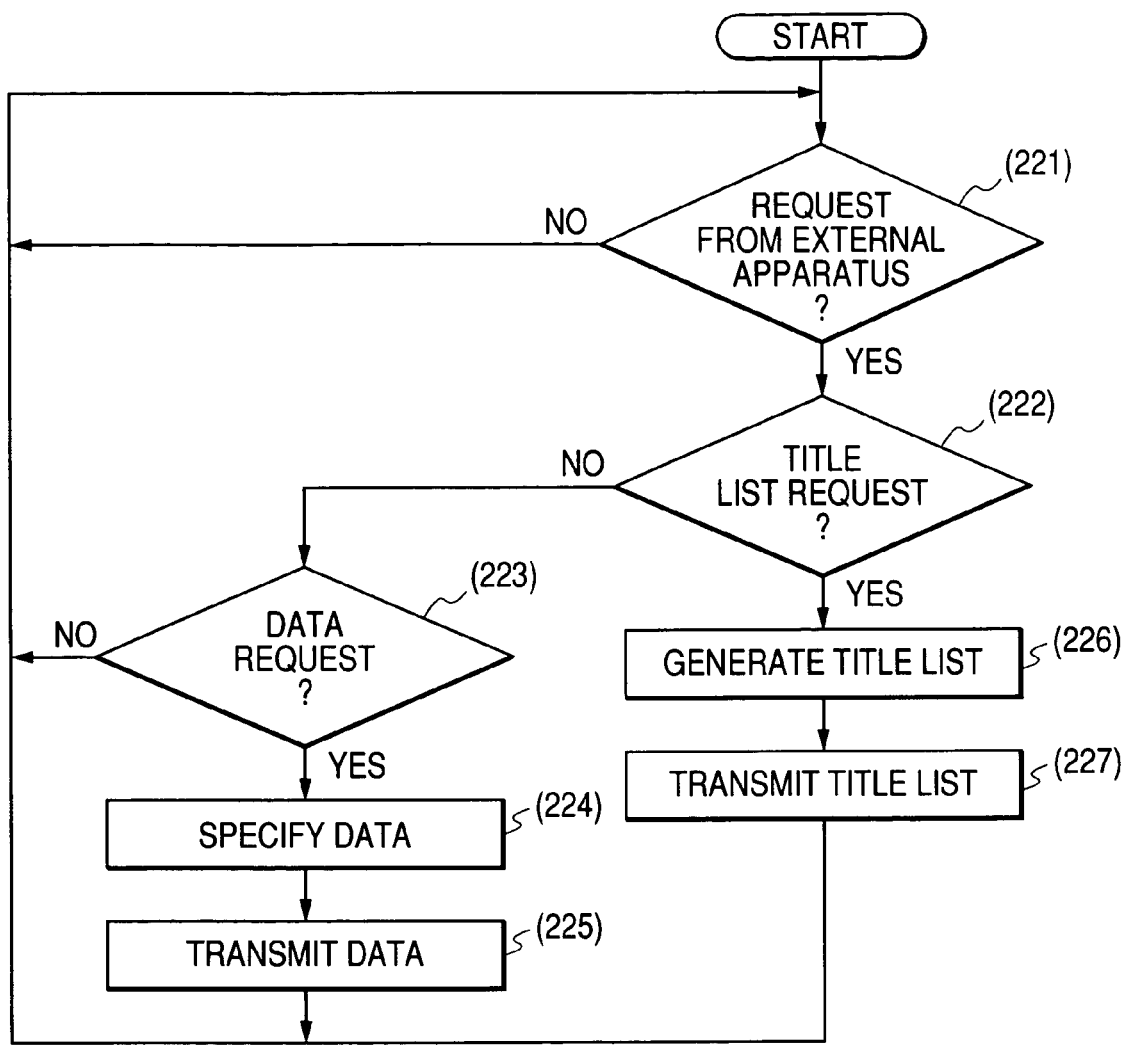
FIG. 28 is a flow chart showing an example of a fifth data processing procedure in the print processing system according to the present invention.
FIG. 29 is a diagram showing the data construction of the stock information transmitted by the management server shown in FIG. 20 to a computer.

The title list/data processing program is executed based on a control procedure according to a flow chart shown in FIG. 28.

FIG. 28 is the flow chart showing an example of a fifth data processing procedure in the print processing system according to the present invention, and the fifth data processing procedure corresponds to the control procedure based on the title list/data processing program in the management server 50. Here, it should be noted that bracketed numerals (221) to (227) denote respective steps which correspond to the steps to be executed by loading the relevant control program from the HDD 22 onto the RAM 21 under the control of the CPU 20 of the management server 50.

First, when the management server 50 starts the operation, the title list/data processing program is automatically loaded to the RAM 502 and then activated to wait for a transmission request from the external apparatus such as the computer 51 or 53 in the present embodiment (221). Here, it should be noted that the step (221) is repeated until the request is issued.

Then, when judged by the management server 50 in the step (221) that the transmission request is issued from the external apparatus, it is further judged whether or not the title list transmission request is issued (222). When judged that the transmission request from the external apparatus is not the title list transmission request, it is further judged by the management server 50 whether or not the request from the external apparatus is the data transmission request (223). When judged that the request from the external apparatus is not the data transmission request, the flow returns to the step (221).

On the other hand, when judged in the step (223) that the request from the external apparatus is the data transmission request, the record which has the ID, included in the data transmission request, of the data of which the transmission is requested is checked by referring to the management database, and the path where the data is held is acquired, whereby the data is specified (224).

Then, the data which is held in the path acquired in the step (224) is transmitted to the external apparatus which issued the transmission request (225), and the flow returns to the step (221).

In the meantime, when judged in the step (222) that the request from the external apparatus is the title list transmission request, the title list data is generated by referring to the ID's and the titles of all the records registered in the management database of the management server 50 (226).

Then, the management server 50 transmits the title list data generated in the step (226) to the external apparatus which issued the transmission request (227), and the flow returns to the step (221).

Next, the data process of the management server 50 shown in FIG. 20 based on the stock information communication program will be explained with reference to the flow chart shown in FIG. 17. Here, it should be noted that the stock information communication program in the present embodiment is the same as that in the first embodiment shown in FIG. 17. In the following, the data process of the management server 50 in the present embodiment based on the stock information communication program will be explained with reference to the step numbers shown in FIG. 17.

First, when the management server 50 starts the operation, the stock confirmation program is automatically activated to wait for the stock inquiry from the external apparatus (161). Here, it should be noted that the step (161) is repeated until the inquiry is received. Then, the information indicating which ID the CD concerning the stock inquiry sent from the external apparatus is directed to is acquired by the CPU of the management server 50 (162), and the stock information of the CD having the acquired ID is acquired from the management database (163).

Subsequently, it is judged whether or not the CD corresponding to the ID designated by the CPU of the management server 50 exists (164). When judged that the CD exists, the stock information indicating the CD acquired from the stock management database is transmitted to the external apparatus from which the stock inquiry was issued (166), and the flow returns to the step (161).

Meanwhile, when judged in the step (164) that the CD does not exist, the CPU of the management server 50 notifies the external apparatus from which the stock inquiry was issued that the relevant CD does not exist (165), and the flow returns to the step (161). Here, it is assumed that the stock information to be transmitted in the step (166) has, for example, a data construction as shown in FIG. 29.

FIG. 29 is the diagram showing the data construction of the stock information transmitted from the management server 50 to the computer 51, 53 or the like shown in FIG. 20.

In the present embodiment, the stock information has the data construction as shown in FIG. 29, which consists of the ID of the CD to which the stock information is requested, the stock amount of the relevant CD (i.e., the number of stocked CD's), and the duration of delivery (or delivery time) which indicates the dates necessary to deliver the relevant CD to the base at which the external apparatus which issued the stock inquiry is disposed. Incidentally, it should be noted that the ID and the stock amount are acquired by referring to the management database, and the duration of delivery is acquired by referring to the delivery time database.

Next, the operation of the computer 51 and the operation of the CD-R writing apparatus 52 will be explained. Here, it should be noted that the CD-R writing apparatus 52 is the apparatus for recording data on a CR-D medium or a CD-RW medium under the control of the computer 51.

Hereinafter, a process that CD writing data is acquired from the management server 50 under the control of the computer 51 and the acquired data is written onto a medium by the CD-R writing apparatus 52 will be explained.

Figure 30:
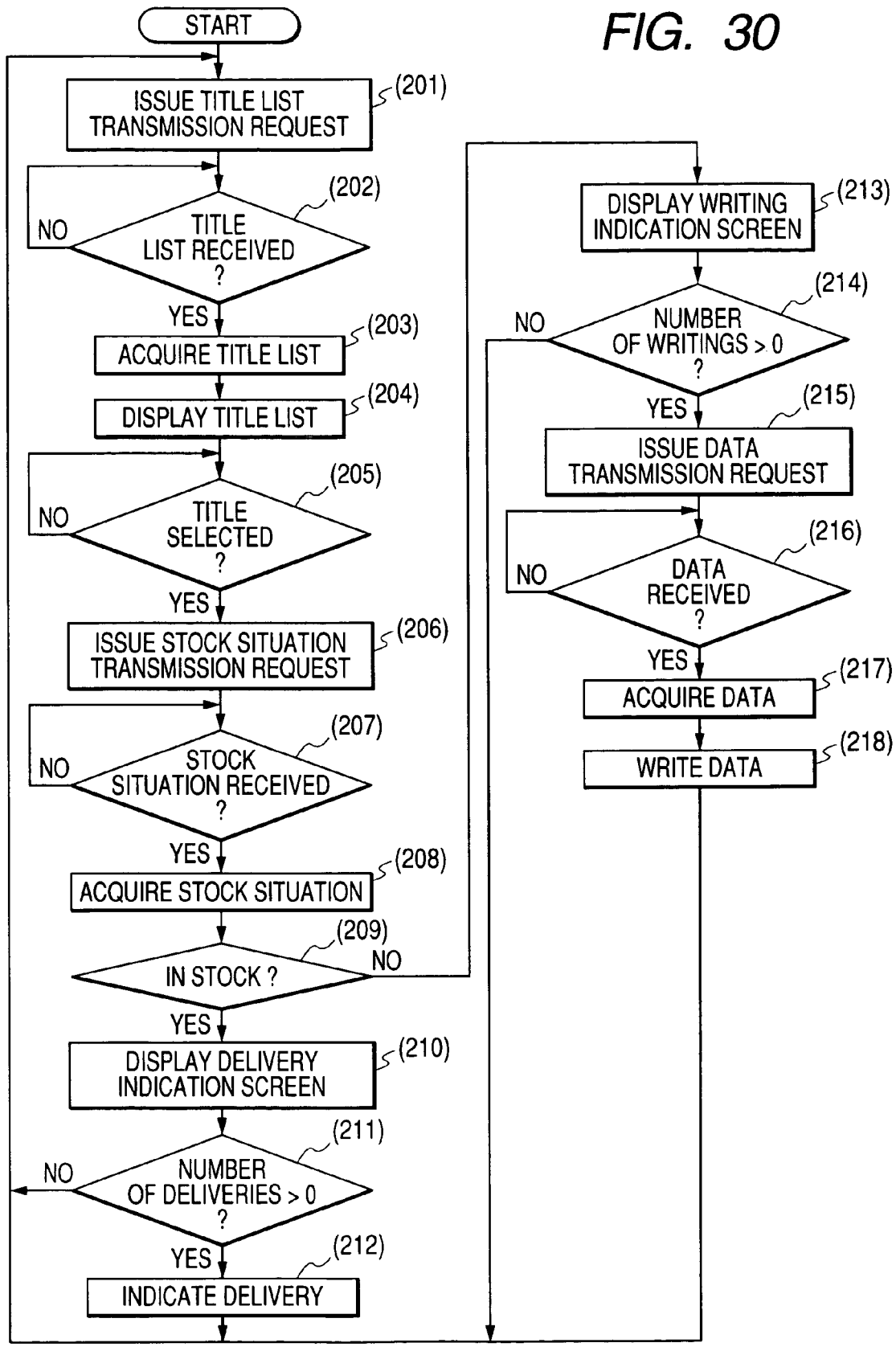
FIG. 30 is a flow chart showing an example of a sixth data processing procedure in the print processing system according to the present invention.

FIG. 30 is a flow chart showing an example of a sixth data processing procedure in the print processing system according to the present invention, and the sixth data processing procedure corresponds to a medium writing processing procedure based on a CD delivery/creation program (or CD delivery/production program) of the computer 51 (or 53) shown in FIG. 20. Here, it should be noted that bracketed numerals (201) to (218) denote respective steps which correspond to the steps to be executed by loading the relevant control program from the HDD 22 onto the RAM 21 under the control of the CPU of the computer 51 (or 53).

First, when the computer 51 starts the operation, the control program is automatically executed to issue the title list transmission request to the management server 50 through the network 90 (201). Then, it is judged whether or not the title list is received from the management server 50 (202). When the title list is received from the management server 50 through the network 90, the data of the title list is received (acquired) (203), and the acquired data is temporarily stored in the RAM.

Incidentally, the CPU of the computer 51 or the like generates the screen data to be displayed on the display unit, from the title list stored in the step (203), whereby the window (stock management screen) as shown in FIG. 23 is displayed (204).

Figure 31:
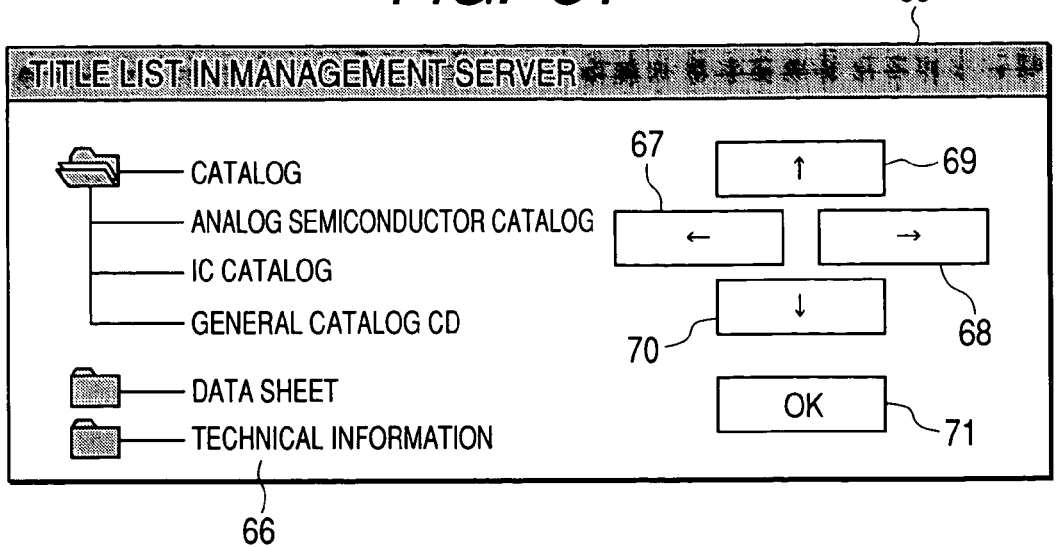
FIG. 31 is a diagram showing an example of a title list display screen displayed on the display unit of computer shown in FIG. 20.

FIG. 31 is a diagram showing an example of a title list display screen displayed on the display unit of computer 51 (or 53) shown in FIG. 20.

Incidentally, a window 65 shown in FIG. 31 includes a title list display section 66 which displays the title list, and the user can select any one of the title displayed in the title list display section 66 by appropriately handling a left shift button 67, a right shift button 68, an upward shift button 69 and a downward shift button 70.

Then, it is judged whether or not the title is selected by clicking or indicating an OK button 71 (205).

When judged that the document is selected, a stock situation transmission request to which the ID of the selected CD has been added is issued to the management server 50 (106). Subsequently, it is judged whether or not data indicating a stock situation is transmitted from the management server 50 (207).

When the data indicating the stock situation is transmitted from the management server 50, the transmitted stock situation is received (acquired) through the network 90 (208), and the received stock situation is temporarily stored in the RAM or the like.

Incidentally, it should be noted that the data indicating the stock situation includes the ID, the stock amount and the delivery time from the warehouse to the relevant base, as shown in FIG. 29.

Next, it is judged whether or not the stock amount included in the information of the stock situation temporarily stored in the step (208) is equal to or larger than "0" (209). Namely, when it is judged that there is the stock, a CD delivery indication screen (or simply a delivery indication screen) for inputting a delivery indication amount is input is displayed on the display of the computer 51 (210). Incidentally, the delivery indication screen in such a form as shown in FIG. 32 is displayed based on the screen data generated by the computer 51 or the like.

Figure 32:
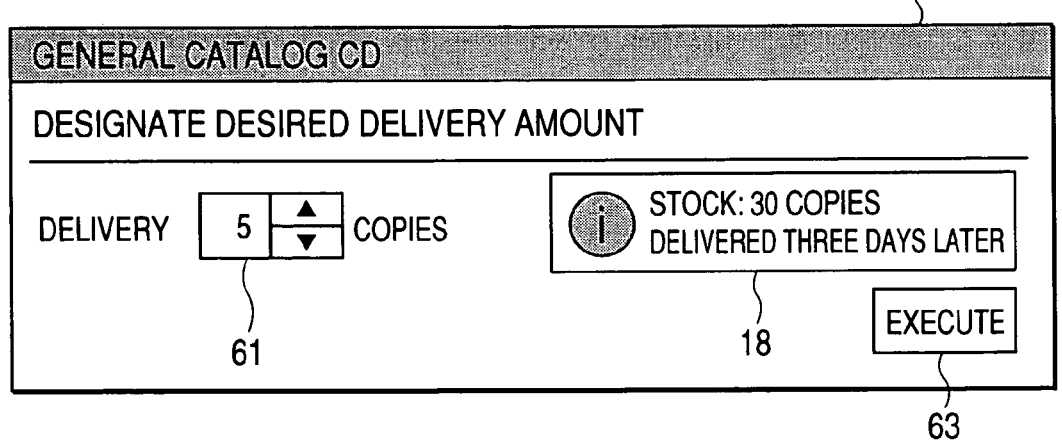
FIG. 32 is a diagram showing an example of a CD delivery indication screen displayed on the display unit of computer shown in FIG. 20.

FIG. 32 is a diagram showing an example of the CD delivery indication screen displayed on the display unit of computer 51 shown in FIG. 20.

Then, for example, in a screen 60 shown in FIG. 32, it is judged by the computer 51 whether or not the value input in a delivery amount input section 61 is larger than "0", (211). When judged that the input value is not larger than "0", the flow returns to the step (201).

Meanwhile, when judged in the step (211) that the input value is larger than "0", an execution button 63 is clicked or indicated to execute the delivery indication to the management server 50 (212). Here, in the delivery indication, the value input in the delivery amount input section 61 is used as the delivery request amount (i.e., number of CD's requested to be delivered).

More specifically, in the delivery indication, the ID of the CD selected in the step (204) and the delivery request amount are transmitted as the delivery request data to the management server 50 through the network 90.

Figure 33:
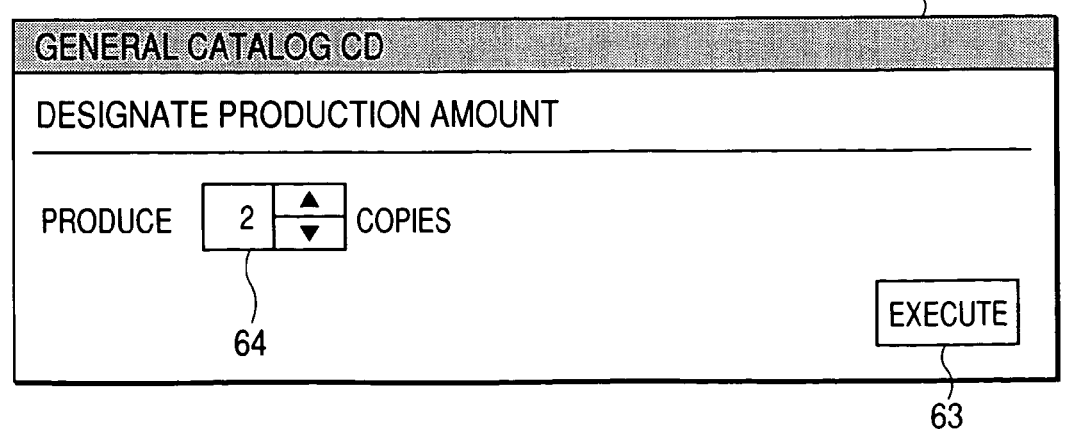
FIG. 33 is a diagram showing an example of a CD writing indication screen displayed on the display unit of computer shown in FIG. 20.

Then, for example, a CD writing indication screen shown in FIG. 33 is displayed on the display unit of the computer 51 (213).

FIG. 33 is the diagram showing an example of the CD writing indication screen displayed on the display unit of computer 51 shown in FIG. 20.

Next, it is judged by the computer 51 or the like whether or not the value input to a production amount input section 64 on a screen 72 of FIG. 33 is larger than "0" (214). Namely, when judged that the input value is not larger than "0", the flow returns to the step (201).

Meanwhile, when judged in the step (214) that the input value is larger than "0", the data transmission request for requesting the management server 50 to transmit the CD writing data of the ID as the number for specifying the ID of the selected CD is transmitted to the management server 50 through the network 90 by clicking or indicating an execution button 63 (215). Then, it is judged whether or not the data is transmitted from the management server 50 (216).

Subsequently, the computer 51 receives (acquires) the data transmitted from the management server 50 through the network 90 (217), and temporarily stores the received data in the RAM or the like.

Then, the set medium is discriminated by the writing apparatus 52 based on the data stored in the step (217) as the CD writing data. Thus, the computer 51 indicates the writing apparatus 52 to write the received data to the discriminated medium such as a CD-R or a CD-RW, whereby, e.g., a general catalog CD is produced (218), and the flow returns to the step (201).

By the above control, the title list is acquired from the management server 50, and the acquired list is displayed on the computer. Thus, the user selects the CD from the displayed title list, the stock information of the selected CD is inquired to the management server 50, and the delivery indication screen for the delivery indication is displayed based on the stock information transmitted from the management server 50. Therefore, the user can order the delivery of the relevant CD's, or can produce, if there if no stock, the relevant CD's by using the writing apparatus 52.

Hereinafter, the operation of the whole system which consists of the management server 50, the computer 51 and the writing apparatus 52 will be explained with reference to the steps in the flow charts shown in FIGS. 30, 28, 17, etc.

When the stock of the CD's becomes insufficient at the business base, the user at this base starts the title list/data processing program in the computer 51. Then, when the computer 51 starts the operation, the title list transmission request is transmitted to the management server 50 (201).

When the title list transmission request from the computer 51 is received, the management server 50 executes the steps (222), (226) and (227) shown in FIG. 28 to transmit the title list data to the computer 51 which issued the title list transmission request.

Then, the computer 51 executes the steps (203) (204) shown in FIG. 30 to display the screen shown in FIG. 31 on its display unit, so as to cause the user to select the tile of the CD from the displayed title list. When the user selects the title of the insufficient CD, the computer 51 executes the step (206), whereby the stock situation transmission request for confirming the stock status of the CD's is issued to the management server 50 based on the ID of the CD of the relevant title.

Next, when the stock situation transmission request is received from the computer 51, the management server 50 executes the steps (162) to (166) shown in FIG. 17 to transmit the stock situation data to the computer 51 which issued the transmission request.

When the stock situation data is received from the management server 50, the computer 51 controls to display the delivery indication screen shown in FIG. 32 when it is judged in the step (209) of FIG. 30 that there is the stock, or controls to display the CD writing indication screen shown in FIG. 33 when it is judged in the step (209) that there is no stock.

Incidentally, when the computer 51 controls to display the delivery indication screen, the ID of the CD selected in the step (204) of FIG. 30 and the delivery amount input in the step (210) are transmitted as the delivery request data to the management server 50.

Meanwhile, when the computer 51 controls to display the CD writing indication screen, the data transmission request for requesting to transmit the CD writing data of the ID of the CD selected in the step (204) is transmitted to the management server 50.

When the data transmission request is received, the management server 50 acquires the CD writing data specified by the ID of the relevant CD by referring to the management database, and transmits the acquired data to the computer 51 which issued the transmission request.

Then, when the data transmitted from the management server 50 is received, the computer 51 causes the writing apparatus 52 to write the data on the CR-D medium or the CD-RW medium, thereby producing the CD's.

By the above processing procedure, when the stock of the CD's becomes insufficient at each base, it is possible to order the delivery of the relevant CD's or produce the relevant CD's in accordance with the stock situation.

According to the above embodiments, it is possible to select either one of the delivery order of the stocked information-recorded media and the information writing by the information writing apparatus, in accordance with the stock situation.

Moreover, if cheap printed materials are stocked in a printing company or the like, it is of course possible to order the delivery of the stocked printed materials. Meanwhile, if there is no such cheap printed material, it is possible to print the necessary information on media by using an image formation apparatus such as a printer or the like.

Moreover, even if printing of vouchers, chits, slips and the like is not performed, it is possible to easily order delivery of them on-line.

Moreover, it is possible to easily confirm the time (or duration) necessary to deliver the media, whereby the user can deal with the situation according to the time necessary for the deliver.

Moreover, it is possible to compare the cost for the information-recorded media themselves with the cost for the creation (or production) of the media by using the information writing apparatus, whereby the user can deal with the situation according to the compared costs.

Moreover, because the media are created (or produced) by the information writing means only when there is no stock, the user can use the cheap information-recorded media as much as possible.

Moreover, it is possible to unitarily manage the information and the stock by using one management server.

Hereinafter, the architecture of data processing programs capable of being read by the print processing system according to the present invention will be explained with reference to a memory map shown in FIG. 34.

FIG. 34 is the diagram for explaining the memory map of the storage medium which stores the various data processing programs capable of being read by the print processing system according to the present invention.

Incidentally, although it is not illustrated specifically, also information (e.g., version information, creator information, etc.) for managing the program groups stored in the storage medium may occasionally be stored in the storage medium, and information (e.g., icon information for discriminatively displaying a program, etc.) depending on an OS or the like on the program reading side may occasionally be stored in the storage medium.

Moreover, the data depending on the various programs are managed on the directory of the storage medium. Besides, a program to install various programs into a computer, a program to uncompress installed programs and data when the installed programs and data have been compressed, and the like are occasionally stored.

Furthermore, the functions shown in FIGS. 9, 16, 17, 19, 28, 30 and the like may be executed by a host computer based on externally installed programs. In that case, the present invention is applicable even in a case where an information group including programs is supplied from a storage medium (such as a CD-ROM, a flash memory, an FD or the like) or an external storage medium through a network to an output apparatus.

Incidentally, it is needless to say that the object of the present invention can be achieved in a case where the storage medium storing the program codes of software to realize the functions of the above embodiments is supplied to a system or an apparatus and then a computer (or CPU or MPU) in the system or the apparatus reads and executes the program codes stored in the storage medium.

In that case, the program codes themselves read from the storage medium realize the new functions of the present invention, whereby the storage medium storing these program codes constitutes the present invention.

Therefore, because the form of program is no object if it has an actual function as the program, an object code, a program executed by an interpreter, script data supplied to an OS, and the like may be included as the program.

As the storage medium for supplying the program codes, for example, a flexible disk, a hard disk, an optical disk, a magnetooptical disk, a CR-ROM, a CD-R, a CD-RW, a DVD-ROM, a magnetic tape, a nonvolatile memory card, a ROM, a DVD, a silicon disk or the like can be used.

In that case, the program codes themselves read out of the storage medium realize the functions of the above embodiments, whereby the storage medium storing these program codes constitutes the present invention.

Besides, as a method of supplying programs, there is a method of connecting with a web site on the Internet by using a browser of the client's computer, and downloading the computer program itself of the present invention or a compressed file including an automatic installing function together with the computer program into the recording medium such as a hard disk or the like. Moreover, there is a method of dividing the program codes constituting the program of the present invention into plural files and downloading the respective files from different web sites. That is, a WWW server, an FTP (file transfer protocol) server and the like for downloading the program files for achieving the function processes of the present invention with use of the computer to plural operators are included in the scope of the present invention.

Moreover, it is possible to encrypt the program of the present invention, store the encrypted program in a storage medium such as a CD-ROM or the like, distribute the obtained storage media to users, cause the user who has satisfied a predetermined condition to download key information for decrypting the encrypted program from the web site through the Internet, cause the user in question to install the decrypted program into an appropriate computer, and thus achieve the functions of the present invention.

Moreover, it is needless to say that the present invention includes not only a case where the functions of the above embodiments are realized by executing the program codes read by the computer, but also a case where an OS (operating system) or the like functioning on the computer executes a part or all of the actual process according to instructions of the program codes, whereby the functions of the above embodiments are achieved by that process.

Furthermore, it is needless to say that the functions of the above embodiments can be achieved in a case where the program read from the storage medium is once written in a memory provided in a function expansion board inserted in the computer or a function expansion unit connected to the computer, and then a CPU or the like provided in the function expansion board or the function expansion unit executes a part or all of the actual process according to the instructions of the program.

The present invention is not limited to the above embodiments, but the present invention is intended to cover various modifications and equivalent arrangements (including the organic combination of respective embodiments) included within the spirit and scope of the appended claims.

Although the embodiment has been explained by way of various examples, it is apparent for one of ordinary skill in the art that the purpose and the scope of the present invention are not limited to the specific explanations described in the present application.

Incidentally, the present invention is not limited to the above embodiments. That is, various modifications are of course possible within the range not departing from the scope of the present invention. For example, in the present invention, it is possible to also provide a system in which the document server accepts a stock request, inquires the stock management server about the relevant stock, and returns the inquired result to the information writing apparatus at the business base.

According to the above embodiments, it is possible, according to the stock situation, to select either one of the delivery order of the stocked information-recorded media and the information writing by the information writing apparatus.

Moreover, if cheap printed materials are stocked in a printing company or the like, it is possible to order the delivery of the stocked printed materials. Meanwhile, if there is no such cheap printed material, it is possible to print the necessary information on media by using the image formation apparatus such as the printer or the like.

Moreover, even if the printing of vouchers, chits, slips and the like is not performed, it is possible to easily order the delivery of them on-line.

Moreover, it is possible to easily confirm the time (or duration) necessary to deliver the information-recorded media, whereby the user can deal with the situation according to the time necessary for the deliver.

Moreover, it is possible to compare the cost for the information-recorded media themselves with the cost for the creation (or production) of the media by using the information writing apparatus, whereby the user can deal with the situation according to the compared costs.

Moreover, because the media are created (or produced) by the information writing means only when there is no stock, the user can use the cheap information-recorded media as much as possible.

Moreover, it is possible to unitarily manage the information and the stock by using one management server.

As explained above, according to the embodiments of the present invention, it is possible to prevent from occurring the problems expected as in the related background art, and it is thus possible to construct the convenient system. Moreover, for example, in a case where it is necessary to perform a new issue request process of which the issue amount of the information-recorded media is small, if the small amount of information-recorded media are still stocked and managed in the warehouse, it is possible to newly issue the information-recorded media of necessary and sufficient amount by effectively using the stocked media. For this reason, it is possible to provide the system which can effectively perform a reissue process for the necessary information-recorded media of large or small amount in an operable and convenient environment without increasing the stock amount. In addition, it is possible to freely construct such a convenient issue processing system.

This application claims priority from Japanese Patent Application No. 2003-404290 filed on Dec. 3, 2003, which is hereby incorporated by reference herein.

What is claimed is:

1. An information management system in which a file server that holds file information, a stock management server that manages a stock of an image-printed medium on which an image based on the file information has been printed, and a printing apparatus can communicate,
    wherein said stock management server comprises:
        a storage unit adapted to store stock information indicating an amount of the stock of the image-printed medium on which the image based on the file information has been printed, and identification information of the file information, and
        a first reply unit adapted to reply, according to an inquiry of stock information corresponding to the identification information indicated by said printing apparatus, the stock information corresponding to the indicated identification information to said printing apparatus,
    wherein said file server comprises:
        a second reply unit adapted to reply, according to an acquisition request of a file information list issued from said printing apparatus, the file information list to said printing apparatus, and
        a third reply unit adapted to reply, according to an acquisition request of the file information issued from said printing apparatus,, the file information to said printing apparatus,
    wherein said printing apparatus comprises:
        a display control unit adapted to cause a display unit to display a first screen for displaying the file information list acquired from said file server and enabling a user to select at least one file information from the file information list, and
        an acquisition unit adapted to acquire the stock information corresponding to the selected file information from said stock management server by sending the identification information corresponding to the selected file information to said stock management server,
    wherein said display control unit further causes the display unit to display a second screen on which the stock information acquired from said stock management server, a first designating key to designate a first amount to be delivered, a second designating key to designate a second amount to be printed, and an execution key are simultaneously displayed, and
    wherein, when the execution key is operated in a state in which both the first amount and the second amount have been designated, said printing apparatus performs both an operation of requesting said stock management server to deliver the image-printed medium in a quantity corresponding to the designated first amount and an operation of printing the file information acquired from said file server in a quantity corresponding to the designated second amount.

2. An information management system according to claim 1, wherein
    said stock management server includes a time calculation unit adapted to calculate a time that is necessary to deliver the image-printed medium to a base at which said printing apparatus is disposed, and
    said stock management server is adapted to reply with the time calculated by said time calculation unit together with the stock information to said printing apparatus.

3. An information management system according to claim 1, wherein
    said stock management server comprises a cost management unit adapted to manage cost information indicating a cost necessary to produce the image-printed medium of one unit and cost information indicating a cost necessary to print the image on the medium by said printing apparatus, and
    said stock management server is adapted to reply with the cost information managed by said cost management unit together with the stock information to said printing apparatus.

4. An information management system according to claim 1, wherein
    said display control unit judges whether there is the stock by judging whether the stock information acquired by said acquisition unit indicates "0", and
    said display control unit causes the display unit to display the second screen in a state in which the user can select delivering the image-printed medium when it is judged that there is the stock, and to cause the display unit to display the second screen in a state in which the user can not select delivering the image-printed medium when it is judged that there is no stock.

5. An issue processing method that is adapted to an information management system in which a file server that holds file information, a stock management server that manages a stock of an image-printed medium on which an image based on the file information has been printed, and a printing apparatus can communicate,
    wherein the stock management server executes:
        a storage step of storing stock information indicating an amount of the stock of the image-printed medium on which the image based on the file information has been printed, and identification information of the file information, and
        a first reply step of replying, according to an inquiry of stock information corresponding to the identification information indicated by the printing apparatus, the stock information corresponding to the indicated identification information to the printing apparatus, wherein the file server executes:
  a second reply step of replying, according to an acquisition request of a file information list issued from the printing apparatus, the file information list to the printing apparatus, and
  a third reply step of replying, according to an acquisition request of the file information issued from the printing apparatus, the file information to the printing apparatus, and
wherein the printing apparatus executes:
  a display control step to cause a display unit to display a first screen for displaying the file information list acquired from said file server and enabling a user to select at least one file information from the file information list, and
  an acquisition step to acquire the stock information corresponding to the selected file information from said stock management server by sending the identification information corresponding to the selected file information to said stock management server,
wherein said display control step further causes the display unit to display a second screen on which the stock information acquired from said stock management server, a first designating key to designate a first amount to be delivered, a second designating key to designate a second amount to be printed, and an execution key are simultaneously displayed, and
wherein, when the execution key is operated in a state in which both the first amount and the second amount have been designated, said printing apparatus performs both an operation of requesting said stock management server to deliver the image-printed medium in a quantity corresponding to the designated first amount and an operation of printing the file information acquired from said file server in a quantity corresponding to the designated second amount.

6. An issue processing method according to claim 5, wherein the stock management server can receive a delivery request from the printing apparatus, and the printing apparatus executes a delivery request process to the stock management server in response to input of the delivery indication of the image-printed medium on a delivery indication screen.

7. An issue processing method according to claim 5, wherein
  the stock management server executes a time calculation step of calculating a time that is necessary to deliver the image-printed medium to a base at which the printing apparatus is disposed, and
  the stock management server replies with the time calculated in said time calculation step together with the stock information to the printing apparatus.

8. An issue processing method according to claim 5, wherein
  the stock management server performs a cost management step of managing cost information indicating a cost necessary to produce the image-printed medium of one unit and cost information indicating a cost necessary to print the image on the medium by the printing apparatus, and
  the stock management server replies with the cost information managed in said cost management step together with the stock information to the printing apparatus.

9. An issue processing method according to claim 5, wherein
  said display control step judges whether there is the stock by judging whether the stock information acquired in said acquisition step indicates "0", and
  said display control step causes the display unit to display the second screen in a state in which the user can select delivering the image-printed medium when it is judged that there is the stock, and causes the display unit to display the second screen in a state in which the user can not select delivering the image-printed medium when it is judged that there is no stock.

10. A computer-readable storage medium that stores a program for achieving an issue processing method that is adapted to an information management system in which a file server that holds file information, a stock management server that manages a stock of an image-printed medium on which an image based on the file information has been printed, and a printing apparatus can communicate,
  wherein the stock management server executes;
    a storage step of storing stock information indicating an amount of the stock of the image-printed medium on which the image based on the file information has been printed, and identification information of the file information, and
    a first reply step of replying, according to an inquiry of stock information corresponding to the identification information indicated by the printing apparatus, the stock information corresponding to the indicated identification information to the printing apparatus,
  wherein the file server executes:
    a second reply step of replying, according to an acquisition request of a file information list issued from the printing apparatus, the file information list to the printing apparatus, and
    a third reply step of replying, according to an acquisition request of the file information issued from the printing apparatus, the file information to the apparatus,
  wherein the printing apparatus executes:
    a display control step to cause a display unit to display a first screen for displaying the file information list acquired from said file server and enabling a user to select at least one file information from the file information list, and
    an acquisition step to acquire the stock information corresponding to the selected file information from said stock management server by sending the identification information corresponding to the selected file information to said stock management server,
  wherein said display control step further causes the display unit to display a second screen on which the stock information acquired from said stock management server, a first designating key to designate a first amount to be delivered, a second designating key to designate a second amount to be printed, and an execution key are simultaneously displayed, and
  wherein, when the execution key is operated in a state in which both the first amount and the second amount have been designated, said printing apparatus performs both an operation of requesting said stock management server to deliver the image-printed medium in a quantity corresponding to the designated first amount and an operation of printing the file information acquired from said file server in a quantity corresponding to the designated second amount.

* * * * *